US012621371B2

(12) United States Patent
Lingerfelt et al.

(10) Patent No.: US 12,621,371 B2
(45) Date of Patent: May 5, 2026

(54) SMART ALERTING OF ENTITY OF ONLINE SOFTWARE PLATFORM (OSP) ABOUT THEIR USER PROFILE AND CUSTOM RULES BEING IMPACTED BY UNDERLYING CHANGES IN DATA THAT THE OSP USES TO PROCESS THE ENTITY DATA

(71) Applicant: Avalara, Inc., Seattle, WA (US)

(72) Inventors: Charles David Lingerfelt, Morrisville, NC (US); Nikki Nash, Bremerton, WA (US); Stefan Kim, Maple Valley, WA (US)

(73) Assignee: Avalara, Inc., Seattle, WA (US)

( * ) Notice: Subject to any disclaimer, the term of this patent is extended or adjusted under 35 U.S.C. 154(b) by 31 days.

(21) Appl. No.: 17/365,322

(22) Filed: Jul. 1, 2021

(65) Prior Publication Data

US 2022/0006881 A1 Jan. 6, 2022

Related U.S. Application Data

(60) Provisional application No. 63/047,876, filed on Jul. 2, 2020.

(51) Int. Cl.
*H04L 67/75* (2022.01)
*G06Q 40/12* (2023.01)

(52) U.S. Cl.
CPC ........... *H04L 67/75* (2022.05); *G06Q 40/123* (2013.12)

(58) Field of Classification Search
CPC ...... H04L 67/75; G06Q 40/123; G06Q 30/04; G06F 9/50
See application file for complete search history.

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |
| 8,484,106 B1 * | 7/2013 | Vu ....................... | G06Q 20/102 |
| | | | 70/32 |

(Continued)

FOREIGN PATENT DOCUMENTS

WO 2013/163625 A1 11/2013

OTHER PUBLICATIONS

Faiza Allah Bukhsh, Smart Auditing—Innovating Compliance Checking in Customs Controls, 2013 IEEE International Conference on Business Informatics, pp. 131-138 (Year: 2013).*

(Continued)

*Primary Examiner* — Aaron Tutor
(74) *Attorney, Agent, or Firm* — Jeremiah J. Baunach; Frontier IP Law PLLC

(57) ABSTRACT

An online software platform (OSP) may store custom digital rules used for producing resources for relationship instances of certain primary entities with other entities. A custom rule may be created based on input from the primary entity that is intended to override a corresponding one of other stored digital rules (i.e., resource digital rules). The OSP automatically alerts the primary entity within a user interface or via other communications in response to the determination that an underlying change in data used to process primary entity data would affect a result of application of the custom digital rule, thus enabling such changes to be efficiently addressed and prevent incorrect results being output.

20 Claims, 16 Drawing Sheets

(56)    References Cited

U.S. PATENT DOCUMENTS

| | | | |
|---|---|---|---|
| 8,620,578 B1 | 12/2013 | Brown et al. | |
| 8,725,407 B2 | 5/2014 | Hurley et al. | |
| 9,760,915 B2 | 9/2017 | Pavlou et al. | |
| 10,445,818 B1 | 10/2019 | Chowdhary | |
| 10,769,611 B2 | 9/2020 | McNeel | |
| 2002/0138765 A1 | 9/2002 | Fishman et al. | |
| 2007/0136158 A1 | 6/2007 | Rawlings et al. | |
| 2007/0136159 A1 | 6/2007 | Rawlings et al. | |
| 2010/0004969 A1* | 1/2010 | Menear ................ | G06Q 30/04 |
| | | | 434/362 |
| 2013/0013471 A1 | 1/2013 | Fishman | |
| 2013/0290200 A1 | 10/2013 | Singhal et al. | |
| 2014/0310415 A1* | 10/2014 | Kirner .................... | H04L 47/10 |
| | | | 709/225 |
| 2019/0266668 A1* | 8/2019 | Vail ..................... | G06Q 30/018 |
| 2020/0051677 A1* | 2/2020 | Harrison .............. | G06F 3/0483 |

OTHER PUBLICATIONS

International Search Report and Written Opinion for International Application PCT/US2021/040187, mailed on Oct. 25, 2021, 15 pages.
International Preliminary Report on Patentability received for PCT Patent Application No. PCT/US21/040187, mailed on Jan. 12, 2023, 9 pages.

* cited by examiner

300

400

500

600

Figure 7:
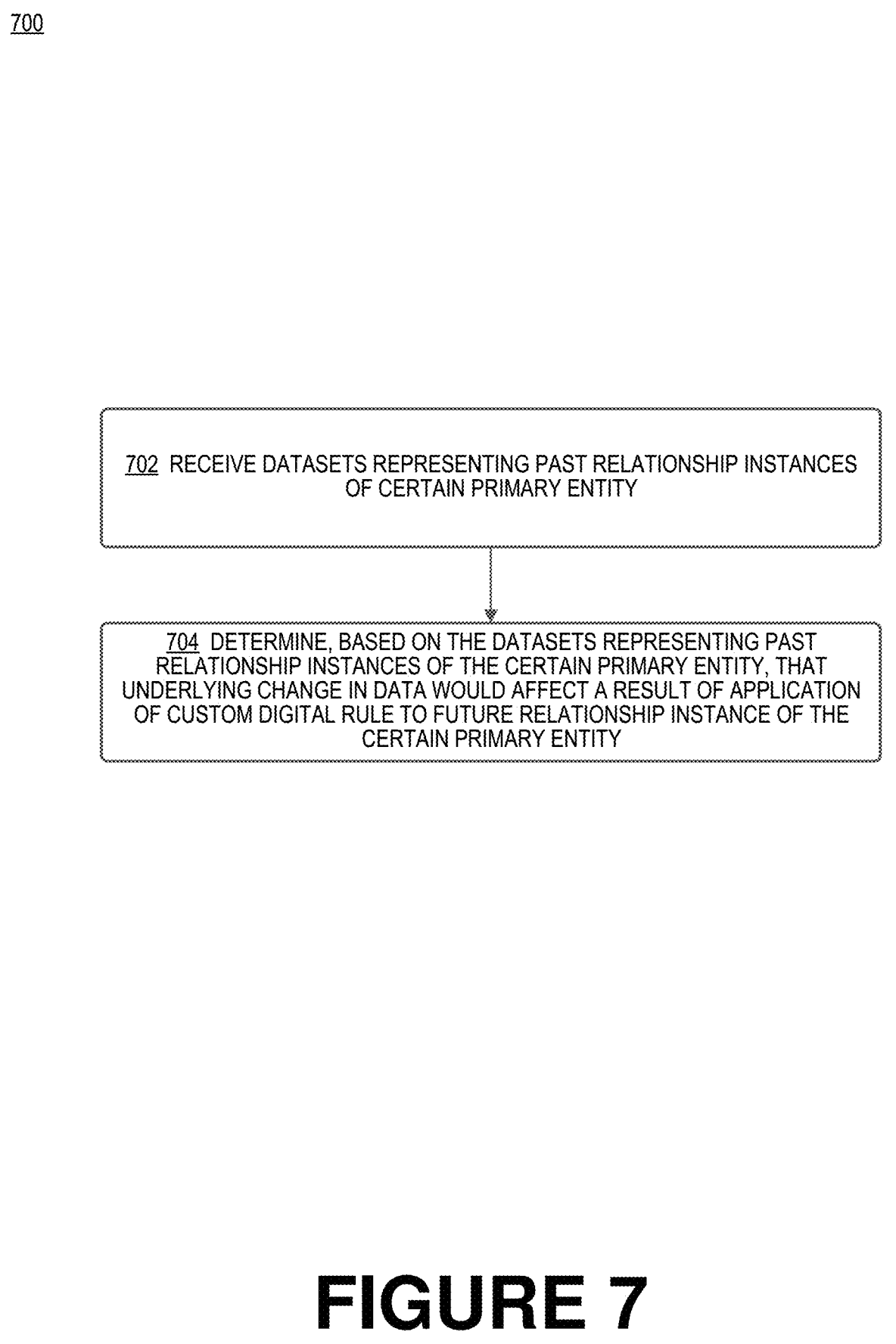

700

702  RECEIVE DATASETS REPRESENTING PAST RELATIONSHIP INSTANCES OF CERTAIN PRIMARY ENTITY

704  DETERMINE, BASED ON THE DATASETS REPRESENTING PAST RELATIONSHIP INSTANCES OF THE CERTAIN PRIMARY ENTITY, THAT UNDERLYING CHANGE IN DATA WOULD AFFECT A RESULT OF APPLICATION OF CUSTOM DIGITAL RULE TO FUTURE RELATIONSHIP INSTANCE OF THE CERTAIN PRIMARY ENTITY

Figure 8:
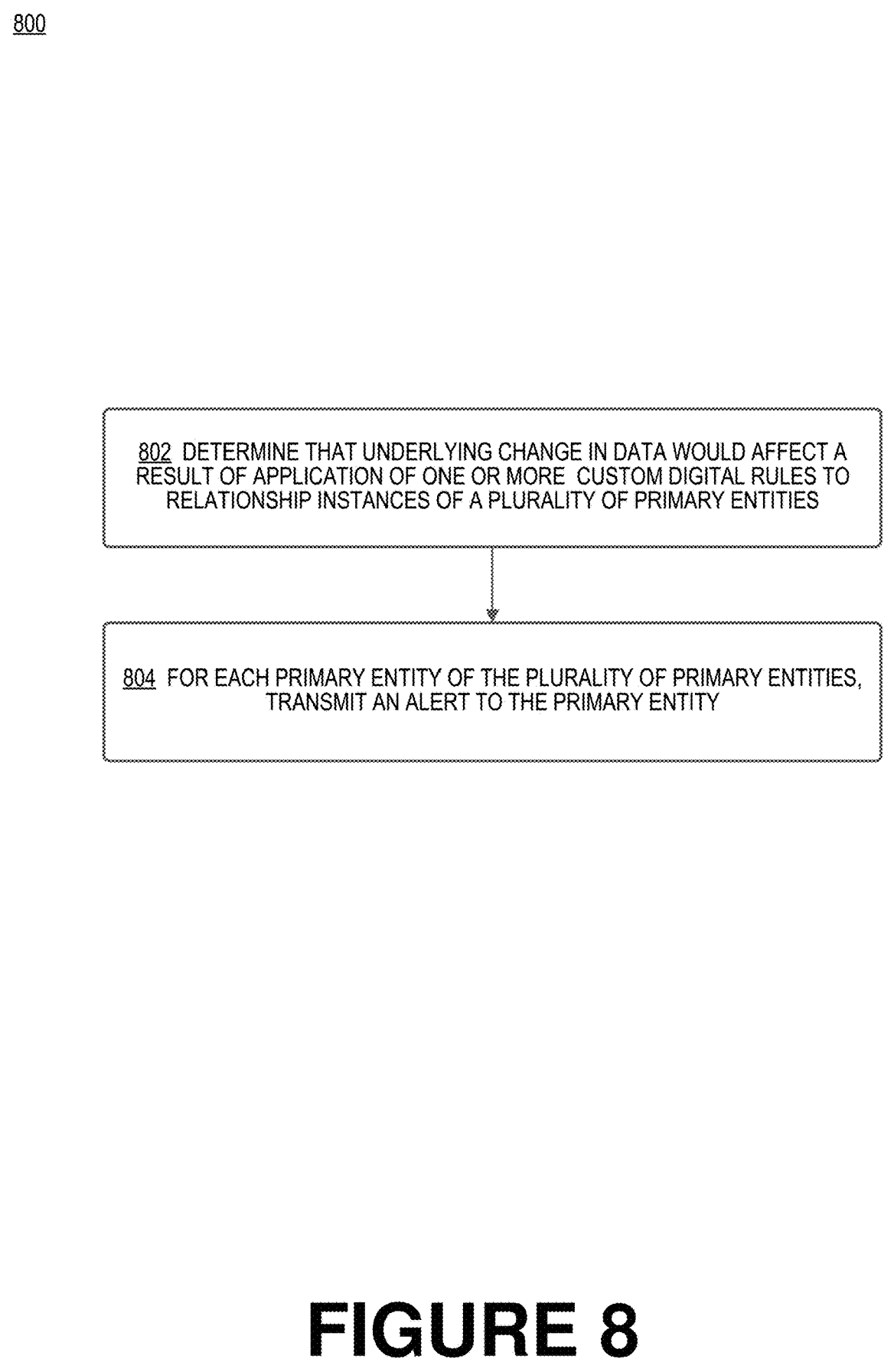

802 DETERMINE THAT UNDERLYING CHANGE IN DATA WOULD AFFECT A RESULT OF APPLICATION OF ONE OR MORE  CUSTOM DIGITAL RULES TO RELATIONSHIP INSTANCES OF A PLURALITY OF PRIMARY ENTITIES

804  FOR EACH PRIMARY ENTITY OF THE PLURALITY OF PRIMARY ENTITIES, TRANSMIT AN ALERT TO THE PRIMARY ENTITY

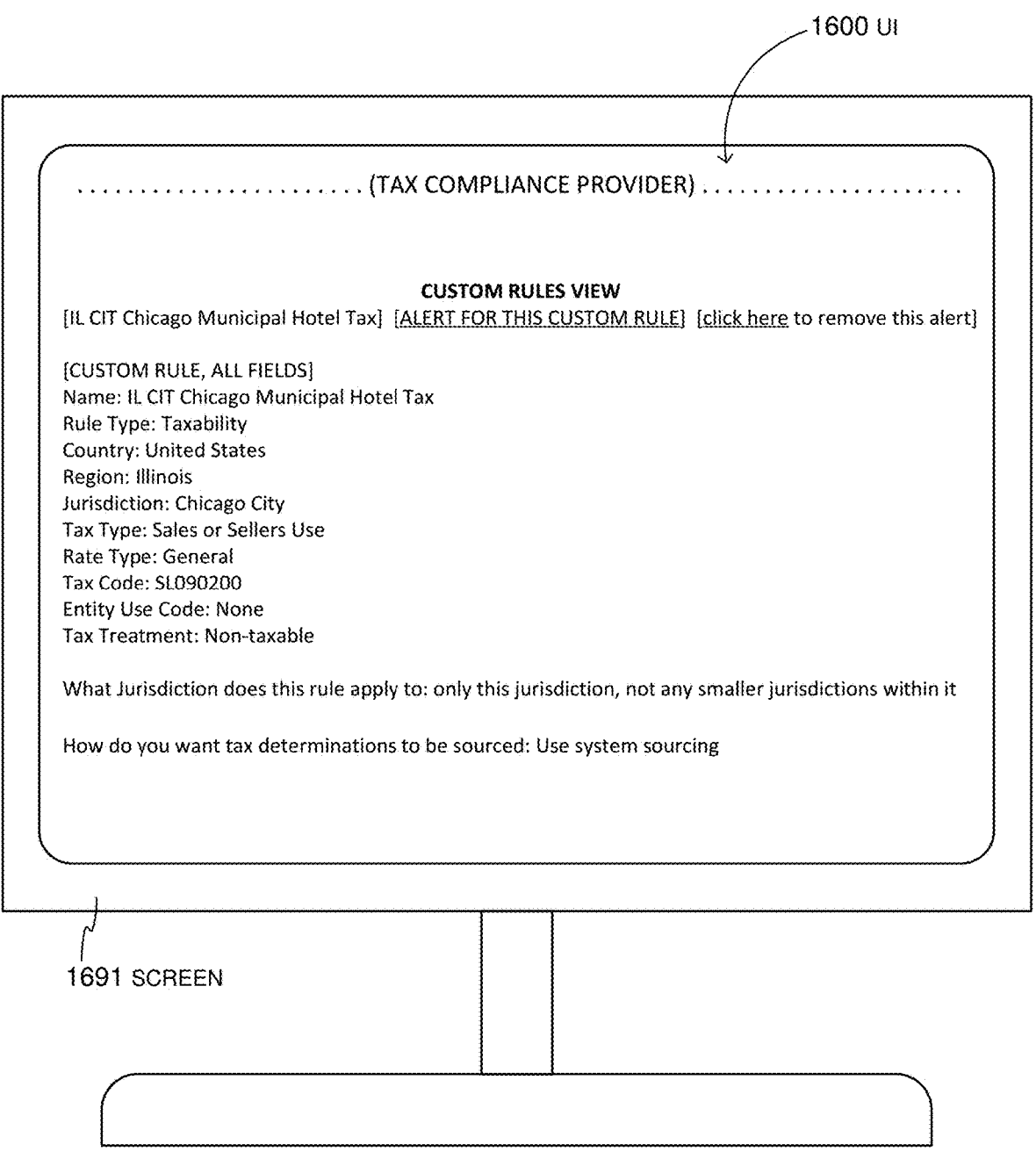

1600 UI

.....................(TAX COMPLIANCE PROVIDER).....................

CUSTOM RULES VIEW

[IL CIT Chicago Municipal Hotel Tax]  [ALERT FOR THIS CUSTOM RULE]  [click here to remove this alert]

[CUSTOM RULE, ALL FIELDS]
Name: IL CIT Chicago Municipal Hotel Tax
Rule Type: Taxability
Country: United States
Region: Illinois
Jurisdiction: Chicago City
Tax Type: Sales or Sellers Use
Rate Type: General
Tax Code: SL090200
Entity Use Code: None
Tax Treatment: Non-taxable What Jurisdiction does this rule apply to: only this jurisdiction, not any smaller jurisdictions within it How do you want tax determinations to be sourced: Use system sourcing

1691 SCREEN

FIGURE 16

SMART ALERTING OF ENTITY OF ONLINE SOFTWARE PLATFORM (OSP) ABOUT THEIR USER PROFILE AND CUSTOM RULES BEING IMPACTED BY UNDERLYING CHANGES IN DATA THAT THE OSP USES TO PROCESS THE ENTITY DATA

TECHNICAL FIELD

The technical field relates to computers in networks, and particularly to networked automated systems for smart alerting of an entity of an online software platform (OSP) about custom rules being impacted by underlying changes in data that the OSP uses to process the entity data.

BRIEF SUMMARY

The present description gives instances of computer systems, devices and storage media that may store programs and methods.

An OSP can be configured to perform one or more predefined services. Such services may include producing respective resources by applying digital rules to respective datasets received from primary entities. The OSP may also store custom digital rules used for producing resources for relationship instances of certain primary entities with other entities. A custom rule may be created based on input from the primary entity that is intended to override a corresponding one of other stored digital rules (i.e., resource digital rules). The OSP may determine whether or not the custom digital rule applies to a received dataset and, if so, produce a resource based on the custom digital rule. If the custom digital rule does not apply to the dataset, then the OSP produces a resource by identifying and applying one of the of resource digital rules to the dataset. Thus, primary entities may provide their own custom digital rules that override other resource digital rules.

However, when there is an underlying change in data used to process primary entity data that would affect a result of application of the custom digital rule to one or more relationship instances of the primary entity, this presents a technical challenge to properly and efficiently address these changes. In particular, such changes may make the custom digital rule (or the reason the custom rule was created) no longer needed, no longer relevant, or cause the custom digital rule to produce a resource that is incorrect or unintended.

Thus, to solve the solve the above technical problems, embodiments of the present disclosure include functionality that enables the OSP to automatically alert the primary entity within a user interface or via other communications in response to the determination that the underlying change in data would affect a result of application of the custom digital rule, thus enabling such changes to be efficiently addressed and prevent incorrect results being output.

Therefore, the systems and methods described herein for smart alerting of an entity of an OSP about custom rules being impacted by underlying changes in data that the OSP uses to process the entity data improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks and to existing computerized systems that facilitate estimation of resources.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 7 is a flowchart for illustrating another sample method for determining that the underlying change in data would affect a result of application of the custom digital rule that is useful in the method of FIG. 3, according to embodiments of the present disclosure, which is an improvement in automated computerized systems.

FIG. 8 is a flowchart for illustrating a sample method for transmitting an alert to multiple primary entities regarding affected custom digital rules of those entities, according to embodiments of the present disclosure, which is an improvement in automated computerized systems.

FIG. 16 is a sample view of a User Interface (UI) in which details of an individual selected custom rule are presented, that may in some embodiments appear in response to a user selecting the name of the custom rule from the listing of all custom rules of FIG. 14 or the "Custom Rule, All Fields" selectable user interface element in the UI of FIG. 15, according to embodiments of the present disclosure, which is an improvement in automated computerized systems.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
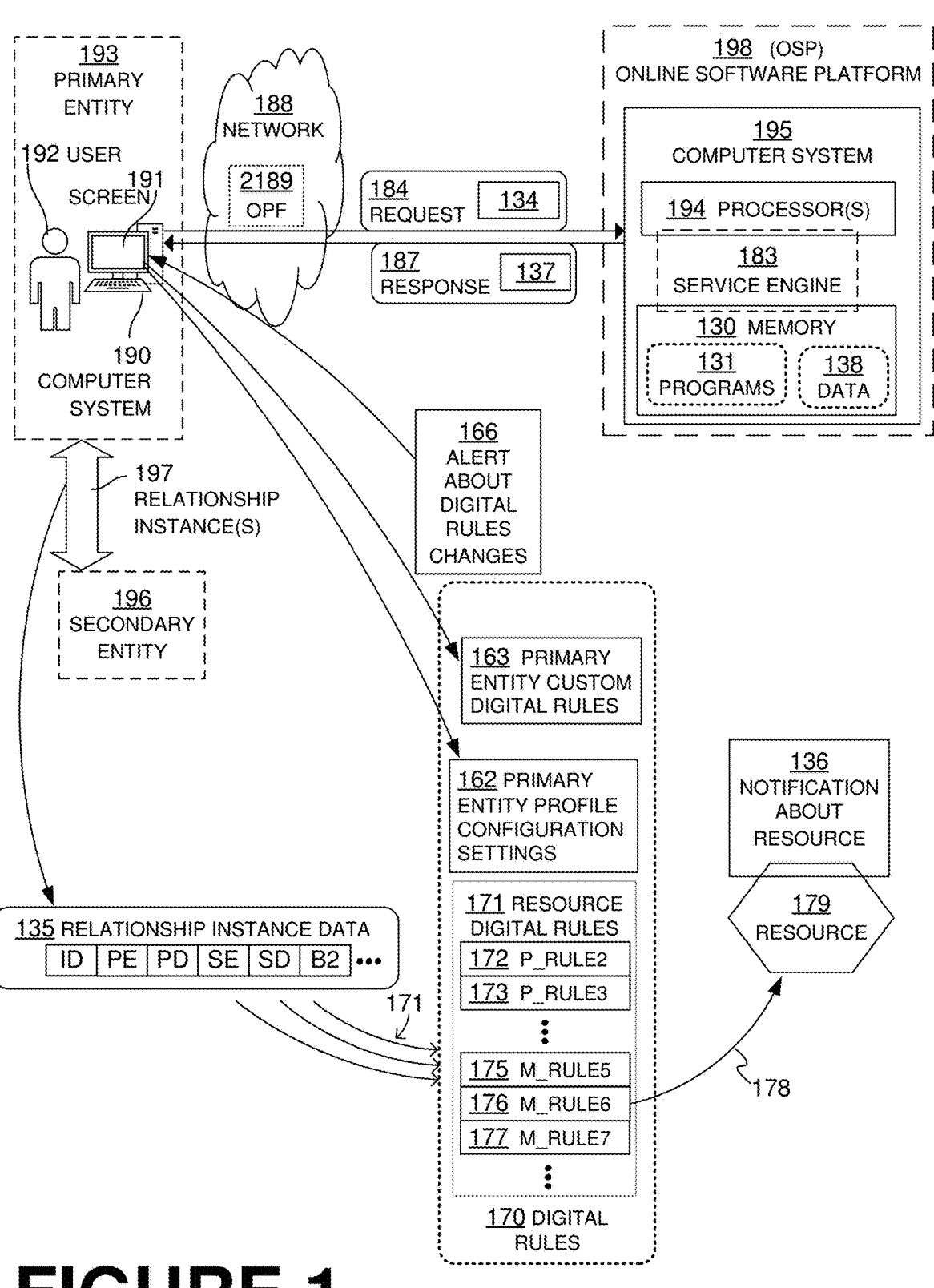
FIG. 1 is a diagram showing sample aspects of embodiments of the present disclosure involving producing an alert about certain digital rule changes, according to embodiments of the present disclosure, which is an improvement in automated computerized systems.

FIG. 1 is a diagram showing sample aspects of embodiments of the present disclosure involving producing an alert about certain digital rule changes, according to embodiments of the present disclosure, which is an improvement in automated computerized systems.

A sample computer system 195, network 188, primary entity computer system 190 and secondary entity 196 according to embodiments is shown. The computer system 195 has one or more processors 194 and a memory 130. The memory 130 stores programs 131 and data 138. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of an online software platform (OSP) 198. The OSP 198 can be configured to perform one or more predefined services, for example, via operations of the service engine 183. Such services can be, but are not limited to: producing respective resources by applying digital rules to respective datasets received by primary entities, such as primary entity 193; storing a custom digital rule used for producing resources for relationship instances of a certain primary entity with other entities, in which the custom rule is created based on input from the certain primary entity that is intended to override a corresponding one of other stored digital rules (i.e., resource digital rules); determining whether or not the custom digital rule applies to a received dataset and, if so, producing a resource based on the custom digital rule; if the custom digital rule does not apply to the dataset, then producing a resource by applying one of the plurality of resource digital rules to the dataset; receiving an indication of an underlying change in data used to process primary entity data; determining that the underlying change in data would affect a result of application of the custom digital rule to one or more relationship instances of the certain primary entity; and transmitting an alert to the certain primary entity in response to the determination that the underlying change in data would affect a result of application of the custom digital rule; and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of a primary entity, such as primary entity 193, which can be referred to also merely as an entity or a client of OSP 198. In such instances, the user 192 can be an agent of the entity 193, and even within a physical site of the entity 193, although that is not necessary. In embodiments, the computer system 190 or other device of the user 192 or the entity 193 are primary entity devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The request 184 may also include particular option selections regarding the one or more predefined services that the OSP 198 can be configured to perform, such as options regarding custom digital rules 163 used to override corresponding stored resource digital rules 171 used to produce a resource 179 and options to receive alerts, such as alert 166. Such alerts may be received in response to a determination by the OSP 198 that an underlying change in data used to process primary entity data, such as relationship instance dataset 135, would affect a result of the application of a particular custom digital rule of primary entity custom digital rules 163 to one or more relationship instances of the primary entity represented by relationship instance data 135. The service engine 183 may then apply digital rules 170 to the payload 134 to determine whether or not a custom digital rule of the primary entity 193 applies to the dataset 135 that may be included in payload 134 and, if so, produces a resource based on the custom digital rule. If the custom digital rule does not apply to the dataset 135, then service engine 183 produces a resource 179 by applying one of the plurality of resource digital rules 171 to the dataset 135. The service engine 183 may form a payload 137 that is an aspect of the resource 179, and then push, send, or otherwise cause to be transmitted a response 187 that carries the payload 137 to the connector. The connector reads the response 187 and forwards the payload 137 to the certain application.

The service engine 183 may receive an indication of an underlying change in data used to process primary entity data, such as relationship instance dataset 135. The indication may be prompted by the OSP receiving the request 184 and then checking for the change, by the underlying change occurring, by receiving updates to or new resource digital rules 171, via notification from the primary entity 193 or other entity, OSP system changes, and/or by periodic checks for such underlying changes by the OSP 198. The service engine 183 may determine that such an underlying change in data would affect a result of an application of a particular custom digital rule of primary entity custom digital rules 163 to one or more relationship instances of the primary entity 193 represented by relationship instance data 135. In some embodiments, the underlying change in data may be a change to one or more of the resource digital rules 170. For example, the service engine 183 may then transmit an alert 166 to the primary entity 193 about the digital rule changes in response to the determination that the digital rule changes would affect a result of an application of the custom digital rule.

In some embodiments, the OSP 198 may generate and deliver a software development kit (SDK) (not shown) including libraries, documentation, code samples, processes, and guides that the primary entity 193 can use and integrate with the connector and other applications of the computer system 190 to implement functionality described herein. The SDK may be a collection of software development tools in one package installable by the primary entity computer system 190. The SDK may facilitate the creation of applications by having a compiler, debugger and a software framework. The SDK may include libraries, documentation, code samples, processes, and guides that the primary entity 193 can use and integrate with the connector and other applications of the computer system 190 to implement the functionality described herein. In various embodiments, the connector may have been built by the primary entity 193, the OSP 198 or another entity. The primary entity 193 may use the SDK for controlling the developing and adjusting, from the primary entity-side, operations of the connector.

In an alternative such architecture, a device remote to the service engine 183, such as computer system 190, may have a particular application (not shown). In addition, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the primary entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 determines the requested resource 179, and sends an aspect of it back to the REST API. In turn, the REST API sends the response 187 that has the payload 137 to the particular application. In some embodiments, the response 137 may include the alert 166 instead of or along with the requested resource 179. Also, in some embodiments, the notification about the resource 136 may include the alert 166 instead of or along with the requested resource 179.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In some instances, the user 192 or the primary entity 193 may have instances of relationships with secondary entities. Only one such secondary entity 196 is shown. However, additional secondary entities may be present in various other embodiments. For example, the primary entity 193 may have a relationship instance 197 with the secondary entity 196 via an intermediary entity (not shown).

In some instances, the user 192 and the primary entity 193 may have data about one or more secondary entities, for example via relationship instances of the user 192 or primary entity with the secondary entity 196. The primary entity 193, an intermediary entity and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In embodiments, the computer system 190 generates one or more datasets. A sample generated dataset 135 is shown. The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196. Accordingly, in this example the sample received dataset 135 has a value ID for an identity of the dataset 1035 and/or the relationship instance 197. The dataset 135 also has a value PE for the name of the primary entity 193 or the user 192. The dataset 135 further has a value PD for relevant data of the primary entity 193, the user 192, or the relationship instance. The dataset 135 also has a value SE for the name of the secondary entity 196. The dataset 135 further has a value SD for relevant data of the secondary entity 196. Plus, an optional value B2 may be a numerical base value for an aspect of the dataset, and so on. The aspect of the dataset may be a numerical value associated with the relationship 197 or an item that is the subject of the relationship instance 197 or the dataset 135. The value B2 may represent an aspect of the value that characterizes the attribute, an aspect of the reason that the dataset 135 was created in the first place, an indication of an identity or other characteristic of the primary entity 193 and/or the secondary entity 196, etc. The dataset 135 may further have additional such values, as indicated by the horizontal dot-dot-dot to the right of the dataset 135. In some embodiments, the dataset 135 has values that characterize additional attributes of each of the primary entity 193 and the secondary entity 196, but that is not required.

In embodiments, stored digital rules 170 may be accessed by the computer system 195. These rules 170 are digital in that they are implemented for use by software. For example, these rules 170 may be implemented within programs 131 and data 138. The data portion of these rules 170 may alternately be implemented in memories in other places, which can be accessed via the network 188. These rules 170 may be accessed responsive to receiving a dataset, such as the dataset 135.

The digital rules 170 may include main rules, which can thus be accessed by the computer system 195. In this example, three sample digital main rules are shown explicitly, namely M_RULE5 175, M_RULE6 176, and M_RULE7 177. In this example, the digital rules 170 also include digital precedence rules P_RULE2 172 and P_RULE3 173, which can thus be further accessed by the computer system 195. The digital rules 170 may include additional rules and types of rules, as suggested by the vertical dot-dot-dots.

In embodiments, a certain one of the digital main rules may be identified from among the accessed stored rules by the computer system 195. In particular, values of the dataset 135 can be tested, according to arrows 171, against logical conditions of the digital main rules, as described later in this document. In an example embodiment, one or more primary entity custom digital rules 163 may have been created based on input from the primary entity 193 that are intended to override one or more corresponding resource digital rules 171. When and how such custom digital rules 163 are to be applied may be configured by the primary entity and such settings may be saved in primary entity profile configuration settings 162. In this example, the certain main rule M_RULE5 175 is thus identified, which is indicated also by the beginning of an arrow 178 that is described in more detail later in this document. Identifying may be performed in a number of ways depending on how the digital main rules are implemented. An example is now described.

Figure 2:
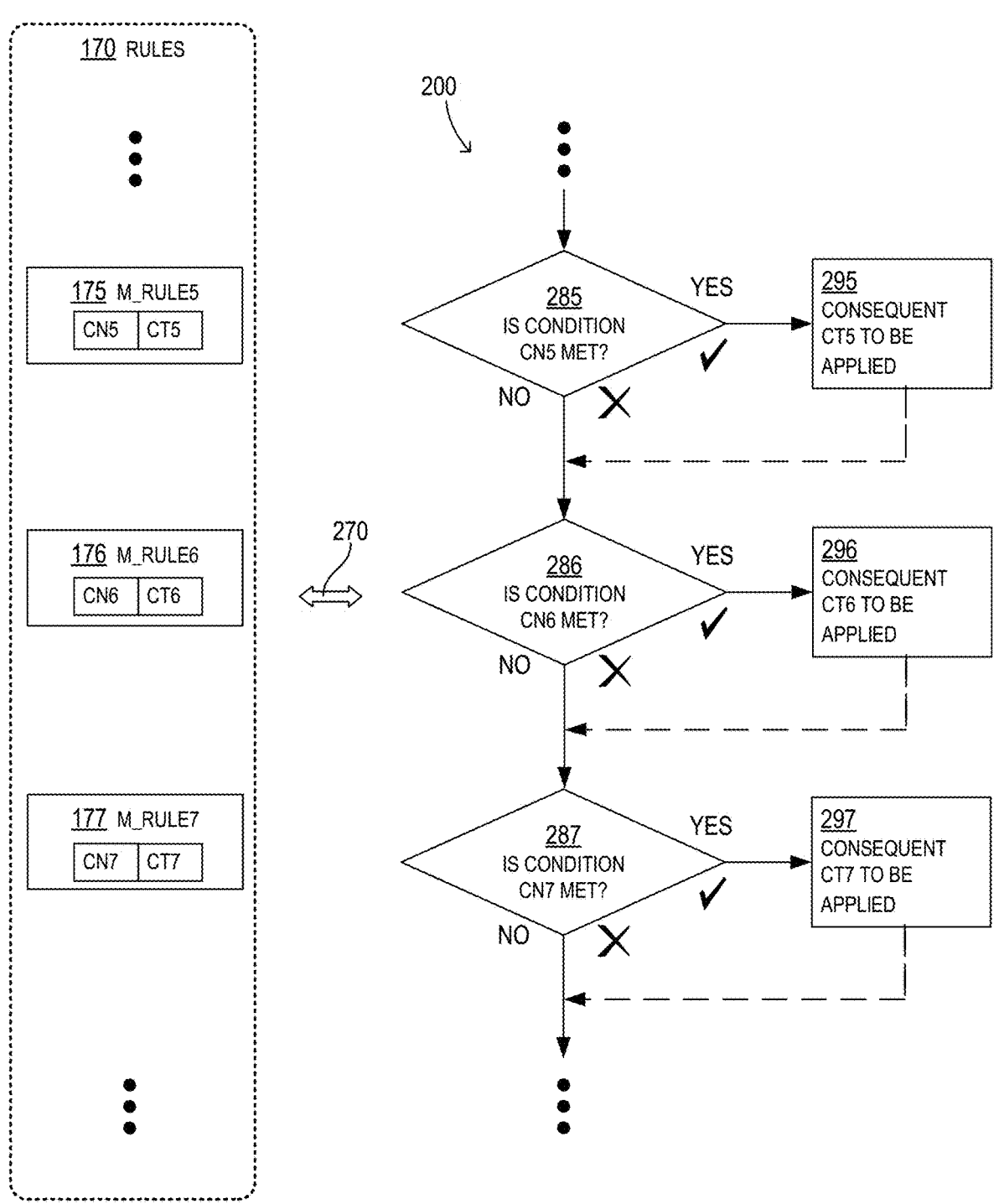
FIG. 2 is a diagram that repeats some of the digital main rules of FIG. 1 in more detail, and juxtaposes them with a flowchart portion for a sample method of how it may be recognized that conditions of a certain digital main rule can be met for its consequent to be applied, all according to embodiments of the present disclosure, which is an improvement in automated computerized systems.

Referring now also to FIG. 2, some of the digital main rules of digital rules 170 are repeated from FIG. 1 in more detail. In addition, according to an arrow 270, these digital main rules are shown juxtaposed with a flowchart portion 200. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. Of course, one or more of the digital rules 170 may have more than one conditions P that both must be met, and so on. And some of these digital rules 170 may be searched for, and grouped, according first to one of the conditions, and then the other. In this example, the digital main rules M_RULE5 175, M_RULE6 176, and M_RULE7 177 of FIG. 1, include respective conditions CN5, CN6, CN7, and respective consequents CT5, CT6, CT7 associated with the respective conditions CN5, CN6, CN7, respectively.

In embodiments, therefore, identifying is performed by recognizing, by the computer system 195, that a certain condition of a certain one of the accessed digital main rules is met by one or more of the values of the dataset. An example of the operations of recognizing that a condition is met and thus identifying an applicable rule is shown by flowchart portion 200 of FIG. 2. According to successive decision diamonds 285, 286, 287, it is determined whether or not conditions CN5, CN6, CN7 are met by at least one of the values of the dataset, respectively. If the answer is NO, then execution may proceed to the next diamond. If the answer is YES then, according to operations 295, 296, 297, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1, the certain M_RULE5 175 was thus identified. With reference to FIG. 2, the identification may have happened at operation 285 of the flowchart portion 200, at which time it was recognized that condition CN5 was met by a value of the dataset 135. This made: the condition CN5 be the certain condition, the digital main rule M_RULE5 175 be the certain digital main rule, and the consequent CT5 be the certain consequent of the certain digital main rule M_RULE5 175. And the certain consequent CT5 is associated with the certain condition CN5, since both are included by the certain digital main rule M_RULE5 175. Therefore, according to operation 295, consequent CT5 is what happens or becomes applied, as described below.

A number of examples are possible for how to recognize that a certain condition of a certain digital rule is met by at least one of the values of the dataset. For instance, the certain condition could define a boundary of a region that is within a space. The region could be geometric, and even be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

In an example embodiment, the certain condition could define a threshold that needs to be crossed for an activity to be started or stopped. In such embodiments, the certain condition could be met responsive to a value based on one or more of the characterized attributes of one or more datasets, either individually or in aggregate, crossing the threshold.

The above embodiments are only examples, and not limiting. For instance, the example of FIG. 2 suggests that there is a one-to-one correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 200. Or, as shown, it may be determined that more than one of the digital main rules is to be applied. In particular, operation 285 may give the answer YES such that consequent CT5 is to be applied, and operation 286 may also give the answer YES such that consequent CT6 is to be applied.

Where more than one of the digital main rules are found that could be applied, there are additional possibilities. For instance, the computer system 195 of FIG. 1 may further access at least one stored digital precedence rule, such as P_RULE2 172 or P_RULE3 173. Accordingly, the certain digital main rule may be thus identified also from the digital precedence rule. In particular, the digital precedence rule may decide which one or more of the digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search of the flowchart portion 200, so as to test the applicability of fewer than all the rules according to arrows 171.

In embodiments, a resource may be produced for the dataset 135, and/or other activities may be automatically started or stopped, by the computer system 195 applying the certain consequent of the certain digital main rule. The resource can be a computational result, a document, an item of value, a representation of an item of value, etc., made, created or prepared for the user 192, the primary entity 193 and/or the secondary entity 196, etc., on the basis of the attribute. As such, in some embodiments, the resource is produced by a determination and/or a computation. In the example of FIG. 1, a resource 179 is produced for the dataset 135, by the computer system 195 applying the certain M_RULE5 175, and in particular its certain consequent CT5, as indicated by the arrow 178. In fact, sometimes applying the consequent is more simply stated as "applying the rule".

The resource may be produced in a number of ways. For example, the certain consequent can be applied to one of the values of the dataset 135. For instance, one of the values of the dataset 135 can be a numerical base value, e.g. B1, that encodes an aspect of the dataset 135, as mentioned above. In such cases, applying the certain consequent may include performing a mathematical operation on the base value B1. For example, applying the certain consequent may include multiplying the base value B1 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

As mentioned above, in some embodiments two or more digital main rules may be applied. For instance, referring again to FIG. 1, the computer system 195 may recognize that an additional condition of an additional one of the accessed digital main rules 170 is met by at least one of the values of the dataset 135, either alone or in combination with other values of other datasets. In this example there would be no digital precedence rules, or the available digital precedence rules would not preclude both the certain digital main rule and the additional digital main rule from being applied concurrently. Such an additional digital main rule would have an additional consequent.

In such embodiments, the resource may be produced by the computer system applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B2 with a second number indicated by the additional consequent, so as to compute a second product. And, the resource may be produced by summing the first product and the second product.

In embodiments, a notification can be caused to be transmitted, e.g., via the network 188, by the computer system. The notification can be about an aspect of the resource, that a condition is met or no longer met, a warning that a condition is or about to be met or no longer be met, that an activity has been or is about to be automatically started or stopped based on a condition being met or no longer being met, and/or include an option to enable or select a setting regarding a service provided by the OSP 198. In the example of FIG. 1, a notification 136 can be caused to be transmitted by the computer system 195, for example as an answer or other response to the received dataset 135. The notification 136 can be about an aspect of the produced resource 179. In particular, the notification 136 may inform about the aspect of the resource 179, namely that it has been determined, where it can be found, what it is, or at least a portion or a statistic of its content, a rounded version of it, and so on. The planning should be that the recipient of the notification 136 understands what it is being provided.

The notification 136 can be transmitted to one of an output device and another device. The output device may be the screen of a local user or a remote user. The notification 136 may thus cause a desired image, message, or other such notification to appear on the screen, such as within a Graphical User Interface (GUI) and so on. The other device can be the remote device, from which the dataset 135 was received, as in the example of FIG. 1. In particular, the computer system 195 may cause the notification 136 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example, the single payload 137 encodes the entire notification 136, but that is not required. Similarly with what is written above about encoding datasets in payloads, the notification 136 instead may be provided via two or more payloads, or in other cases the notification 136 and at least one other notification may be included in the same single payload. Along with the aspect of the resource 179, it can be advantageous to embed in the payload 137 the identity value (ID) and/or one or more values of the dataset 135. This will help the recipient correlate the response 187 to the request 184, and therefore match the received aspect of the resource 179 as the answer or other response to the appropriate dataset.

In an example embodiment, there may be a plurality of relationship instances between the primary entity 193 and one or more secondary entities, such as secondary entity 196. In some embodiments, such relationship instances are between the primary entity 193 and one or more secondary entities, such as secondary entity 196, via one or more intermediary entities (not shown). Each relationship instance may be associated with one or more respective domains of a plurality of domains. In various embodiments, a domain may be a region defined by a boundary as discussed above or may be an entity representing or otherwise associated with the region. For example, the region could be geographic, within the space of a city, a county, a state, a country, a continent or the earth.

For example, in one embodiment, primary entity 193 may have a relationship instance 197 with secondary entity 196 and that particular relationship instance 197 may be associated with one or more domains. The association of the relationship instance 197 with the one or more domains may be based on a variety of characteristics including, but not limited to: a relationship of one or more of the primary entity and secondary entity with the particular domain; a location of one or more of the primary entity and secondary entity within or associated with the particular domain; a region or location associated with one or more of the primary entity and secondary entity being within or associated with the particular domain; a previous relationship of one or more of the primary entity and secondary entity with the particular domain; a location of items associated with one or more of the primary entity and secondary entity within the particular domain; a number of relationships of one or more of the primary entity and secondary entity with the particular domain; a transfer of items associated with one or more of the primary entity and secondary entity to or from an entity within or associated with the particular domain; a transfer of data associated with one or more of the primary entity and secondary entity to or from an entity within or associated the particular domain, etc. The existence or identification of the relationship instance 197 and/or one or more characteristics of the relationship instance 197 may be defined or represented by values of dataset 135.

In some embodiments, for each relationship instance of the plurality of relationship instances represented by dataset 135, the OSP 198 electronically identifies a rate to calculate an amount of resource due to one or more respective domains associated with the relationship instance based on particular attributes of the dataset 135 and the one or more respective domains. For example, the primary entity 193 may send request 184 to the computer system 195 of OSP 198 for services that include producing resources based on the dataset 135. The request 184 may include the existence or identification of the relationship instance 197 and/or one or more characteristics of the relationship instance 197 as part of payload 134. The service engine 183 may then apply digital rules 170 to the relationship instance 197 and/or one or more characteristics of the relationship instance 197 to identify or otherwise determine the rate to calculate an amount of resource due to one or more respective domains associated with the relationship instance.

For example, digital precedence rule P_RULE2 172 may decide that rule M_RULE5 175 is to be applied when a particular condition is met. Digital precedence rule P_RULE2 172 may include a condition that indicates if a particular relationship instance is associated with a particular domain and/or a particular threshold has been crossed due to or otherwise regarding one or more attributes of the relationship instance, either alone or in combination with attributes of other relationship instances, then rule M_RULE5 175 is to be applied. The service engine 183 may determine that the condition is met due to one or more values of dataset 135 indicating the particular relationship instance and that the particular relationship instance is associated with the particular domain and/or a particular threshold has been crossed due to or otherwise regarding one or more attributes of the relationship instance, either alone or in combination with attributes of other relationship instances. Thus, as a consequence of precedence rule P_RULE2 172, the service engine 183 applies rule M_RULE5 175. Rule M_RULE5 175 may include a condition CN5 that indicates if a relationship instance is associated with that particular domain, then, as consequent CT5, a particular rate is to be used to calculate an amount of resource due to that particular domain.

Referring again to FIG. 2, at decision diamond 285 it is determined that the condition CN5 is met (i.e., that a particular attribute of the dataset is associated with a particular domain) and thus, the particular rate is used to calculate an amount of resource due to that particular domain. Thus, by applying digital rules 170, the service engine 183 identifies the rate to calculate an amount of resource due to one or more respective domains associated with the relationship instance based on one or more attributes of the dataset 135, and also calculates an amount of resources due to at least one respective domain associated with the relationship instance based on the identified rate. In some embodiments, this calculated amount of resources due may be included by the service engine 183 as part of the resulting produced resource 179 and/or notification 136. The service engine 183 may then form a payload 137 that is an aspect of the resource 179, and then push, send, or otherwise cause to be transmitted a response 187 that carries the payload 137 to a device remote to the service engine 183, such as computer system 190, a device of secondary entity 196 or another secondary entity. Digital rules 170 may include multiple different digital rules for each type of relationship instance and different domains. In various embodiments, the notification 136 may comprise the response 187, or the response 187 may be included in the notification 136.

In various embodiments, the processes of determining which digital rules apply to the dataset 135 and how to apply them as described with reference to FIG. 2 may also be used by the OSP 198 to determine which, if any, of primary entity custom digital rules 163 apply to the dataset 135 (e.g., whether they override any of the resource digital rules 171) and how to apply them. For example, primary entity custom digital rules 163 may override rates, thresholds, and/or boundaries defined or indicated by one or more resource digital rules and/or override applicability of one or more resource digital rules to one or more datasets of the primary entity, such as dataset 135.

Figure 3:
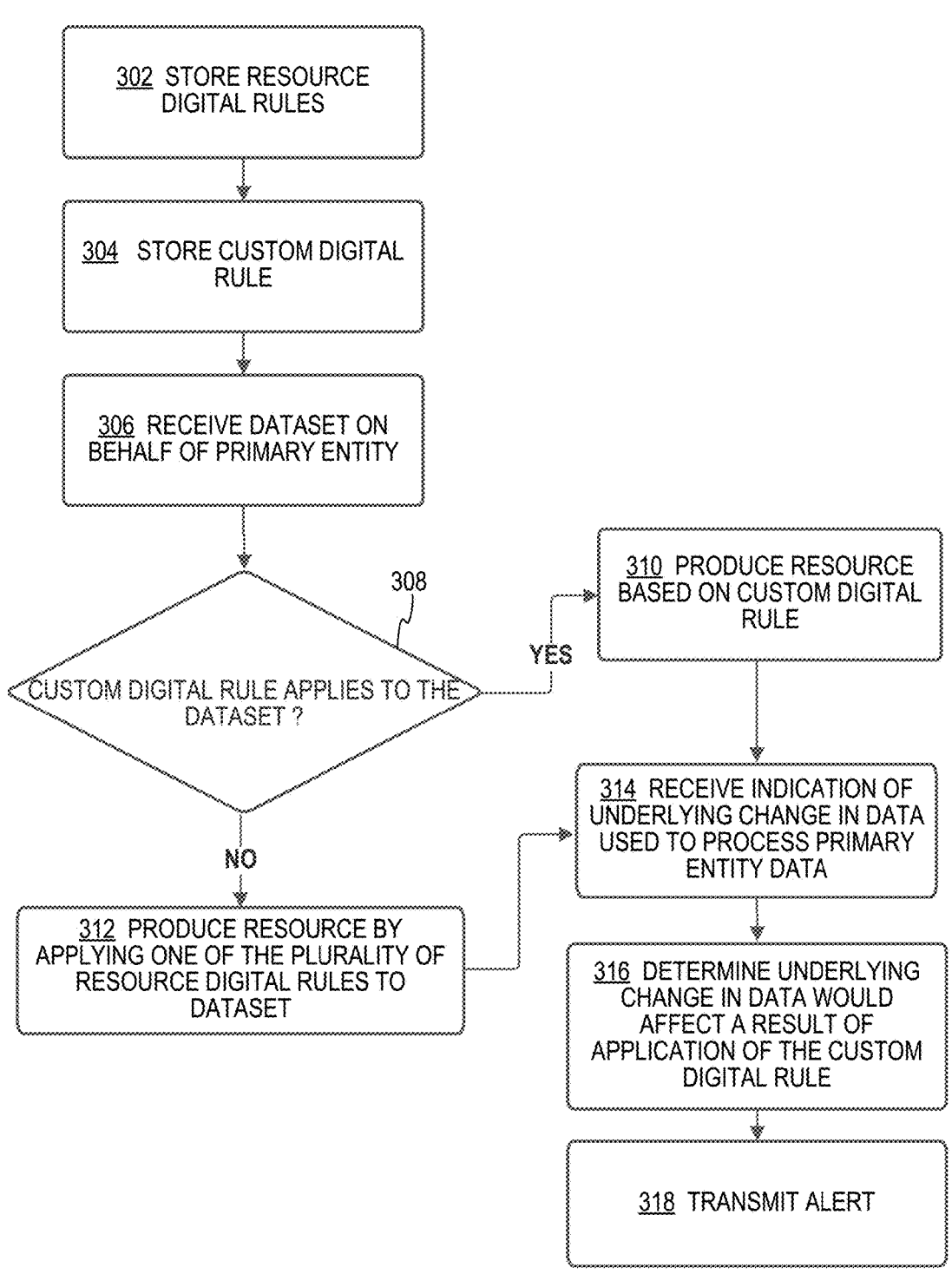
FIG. 3 is a flowchart for illustrating a sample method for transmitting an alert to a certain primary entity in response to a determination that an underlying change in data would affect a result of application of a custom digital rule, according to embodiments of the present disclosure, which is an improvement in automated computerized systems.

FIG. 3 is a flowchart for illustrating a sample method 300 for transmitting an alert to a certain primary entity in response to a determination that an underlying change in data would affect a result of application of a custom digital rule, according to embodiments of the present disclosure, which is an improvement in automated computerized systems.

Although, in the present example, the operations and methods described with reference to the flowcharts illustrated in FIGS. 3-8 are described as being performed by the OSP 198, in various embodiments, one or more of the operations and methods described with reference to the flowcharts illustrated in FIGS. 3-8, or otherwise described herein, may be performed by the primary entity computer system 190 of primary entity 193.

At 302 the OSP 198 stores a plurality of resource digital rules used for producing resources for respective relationship instances of primary entities with other entities.

At 304 the OSP 198 stores a custom digital rule used for producing resources for relationship instances of a certain primary entity with other entities. The custom rule is created based on input from the certain primary entity that is intended to override a corresponding one of the stored resource digital rules.

At 306 the OSP 198 receives a dataset on behalf of the certain primary entity. The the dataset includes data representing a relationship instance between the certain primary entity and a secondary entity.

At 308, in response to the received dataset, the OSP 198, determines whether or not the custom digital rule applies to the dataset and, if the OSP 198 determines the custom digital rule applies to the dataset, the method 300 proceeds to 310. If the OSP 198 determines the custom digital rule does not apply to the dataset, then the method 300 proceeds 312.

At 310, the OSP 198 produces a resource based on the custom digital rule.

At 312, the OSP 198 produces a resource by applying one of the plurality of resource digital rules to the dataset.

At 314, the OSP 198 receives an indication of an underlying change in data used to process primary entity data. For example, the underlying change in data may be a change to one or more of the plurality of resource digital rules; a new resource digital rule for producing resources for respective relationship instances of primary entities; a change in how at least one resource digital rule uses attributes of the relationship instance represented by the dataset to produce a resource for the relationship instance; and/or a change in one or more of: a definition of a domain associated with the relationship instance; a rate used to produce a resource associated with the relationship instance; a definition of a category or type of item that is a subject of the relationship instance; a code used to categorize, identify or define an item that is a subject of the relationship instance; a code used to categorize or define the certain primary entity or the secondary entity; a code used to categorize or define the relationship instance.

At 316, the OSP 198 determines that the underlying change in data would affect a result of application of the custom digital rule to one or more relationship instances of the certain primary entity. For example, a change to one or more of the plurality of resource digital rules regarding a definition of a domain associated with the relationship instance; a rate used to produce a resource associated with the relationship instance; a definition of a category or type of item that is a subject of the relationship instance; a code used to categorize, identify or define an item that is a subject of the relationship instance; a code used to categorize or define the certain primary entity or the secondary entity; and/or a code used to categorize or define the relationship instance may make the custom digital rule that overrides the resource digital rule (or the reason the custom rule was created) no longer needed, no longer relevant or cause the custom digital rule to produce a resource that is incorrect or unintended.

At 318, the OSP 198 transmits an alert to the certain primary entity in response to the determination that the underlying change in data would affect a result of application of the custom digital rule. For example, transmitting the alert may include: instructions for how to update, expire or remove the custom digital rule based on the determination that the underlying change in data would affect a result of application of the custom digital rule to one or more relationship instances of the certain primary entity; transmitting information indicating why the underlying change in data would affect a result of application of the custom digital rule; and/or transmitting a hyperlink that allows the certain primary entity to access a citation supporting the underlying change in data.

In some embodiments, the transmitting the alert is performed before or within a specified timeframe of a change effective date of the underlying change in data or is performed only if the custom digital rule has been applied for the certain primary entity within a specified timeframe before or after a change effective date of the underlying change in data.

Figure 4:
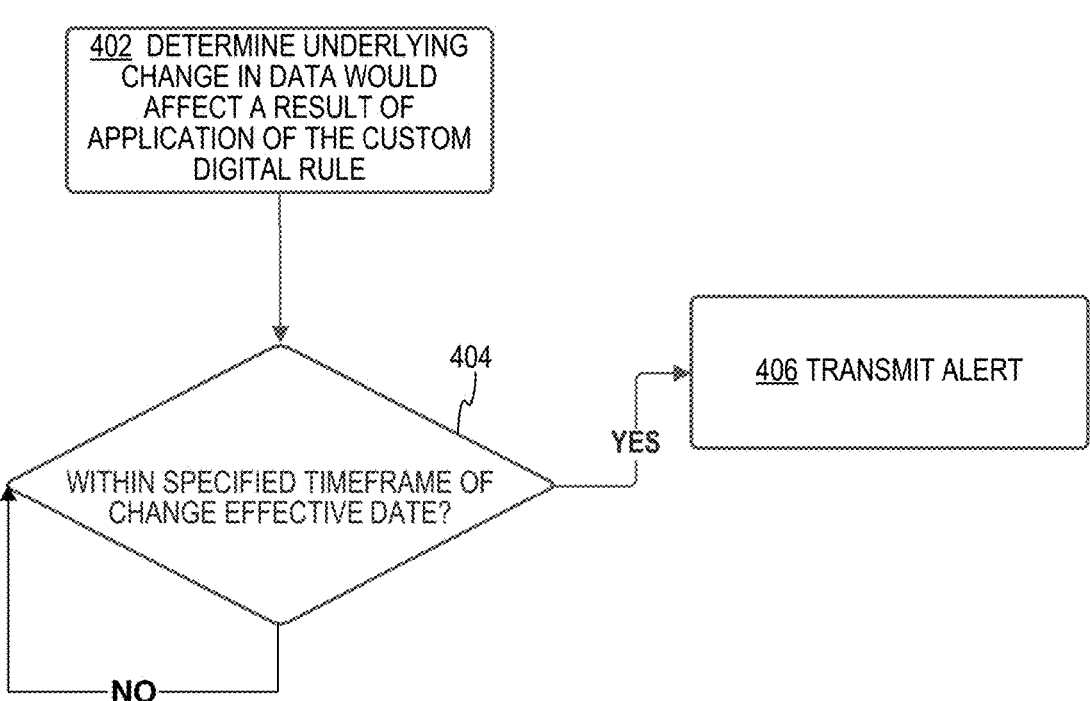
FIG. 4 is a flowchart for illustrating a sample method for transmitting an alert within a specified timeframe of a change effective date of the underlying change in data that is useful in the method of FIG. 3, according to embodiments of the present disclosure, which is an improvement in automated computerized systems.

FIG. 4 is a flowchart for illustrating a sample method 400 for transmitting an alert within a specified timeframe of a change effective date of the underlying change in data that is useful in the method of FIG. 3, according to embodiments of the present disclosure, which is an improvement in automated computerized systems.

At 402, the OSP 198 the OSP 198 determines whether the underlying change in data would affect a result of application of the custom digital rule to one or more relationship instances of the certain primary entity.

At 404, the OSP 198 determines whether the current time is within a specified timeframe of a change effective date of the underlying change in data. If the OSP 198 determines that the current time is within a specified timeframe of a change effective date of the underlying change in data, the method 400 proceeds to 406. If the OSP 198 determines that the current time is not within a specified timeframe of a change effective date of the underlying change in data, the method 400 proceeds to 404 to wait sooner before the change effective date to be within the specified timeframe.

At 406, the OSP 198 transmits the alert to the certain primary entity regarding the determination that the underlying change in data would affect a result of application of the custom digital rule.

Figure 5:
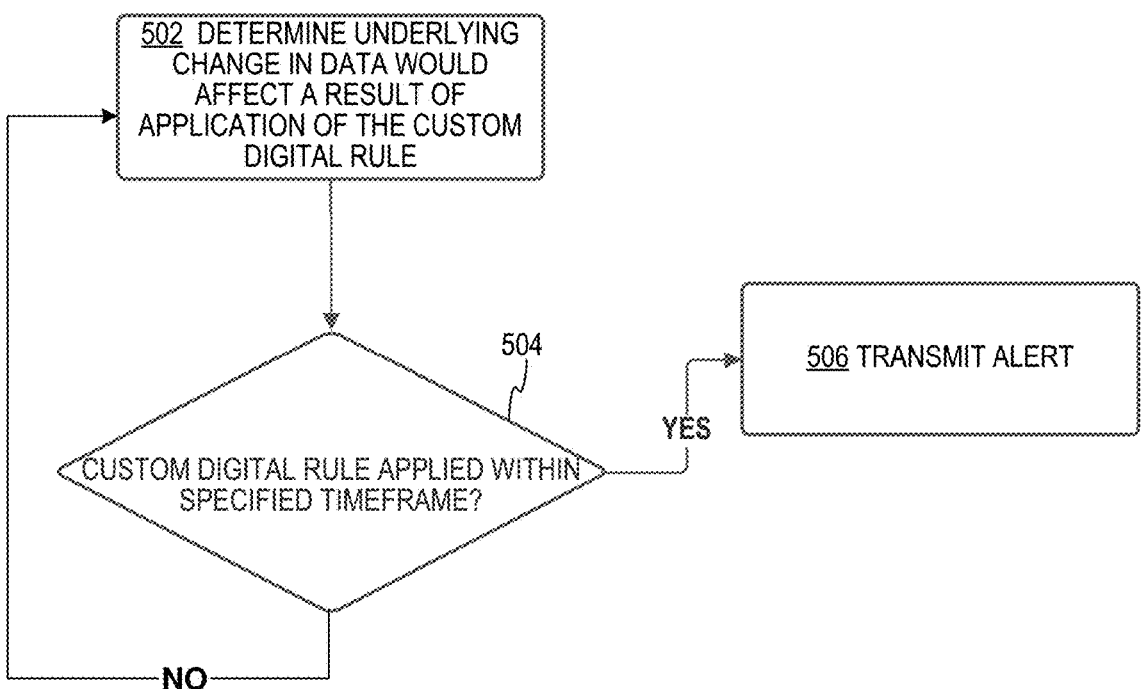
FIG. 5 is a flowchart for illustrating a sample method for transmitting an alert only if the custom digital rule has been applied for the certain primary entity within a specified timeframe that is useful in the method of FIG. 3, according to embodiments of the present disclosure, which is an improvement in automated computerized systems.

FIG. 5 is a flowchart for illustrating a sample method 500 for transmitting an alert only if the custom digital rule has been applied for the certain primary entity within a specified timeframe that is useful in the method of FIG. 3, according to embodiments of the present disclosure, which is an improvement in automated computerized systems.

At 502, the OSP 198 determines whether the underlying change in data would affect a result of application of the custom digital rule to one or more relationship instances of the certain primary entity.

At 504, the OSP 198 determines whether the custom digital rule has been applied for the certain primary entity within a specified timeframe before or after a change effective date of the underlying change in data. If the OSP 198 determines that the custom digital rule has been applied for the certain primary entity within the specified timeframe before or after a change effective date of the underlying change in data, then the method 500 proceeds to 506. If the OSP determines that the custom digital rule has not been applied for the certain primary entity within the specified timeframe before or after a change effective date of the underlying change in data, then the method 500 proceeds to 502 to process the next detected underlying change.

At 506, the OSP 198 transmits the alert to the certain primary entity regarding the determination that the underlying change in data would affect a result of application of the custom digital rule.

Figure 6:
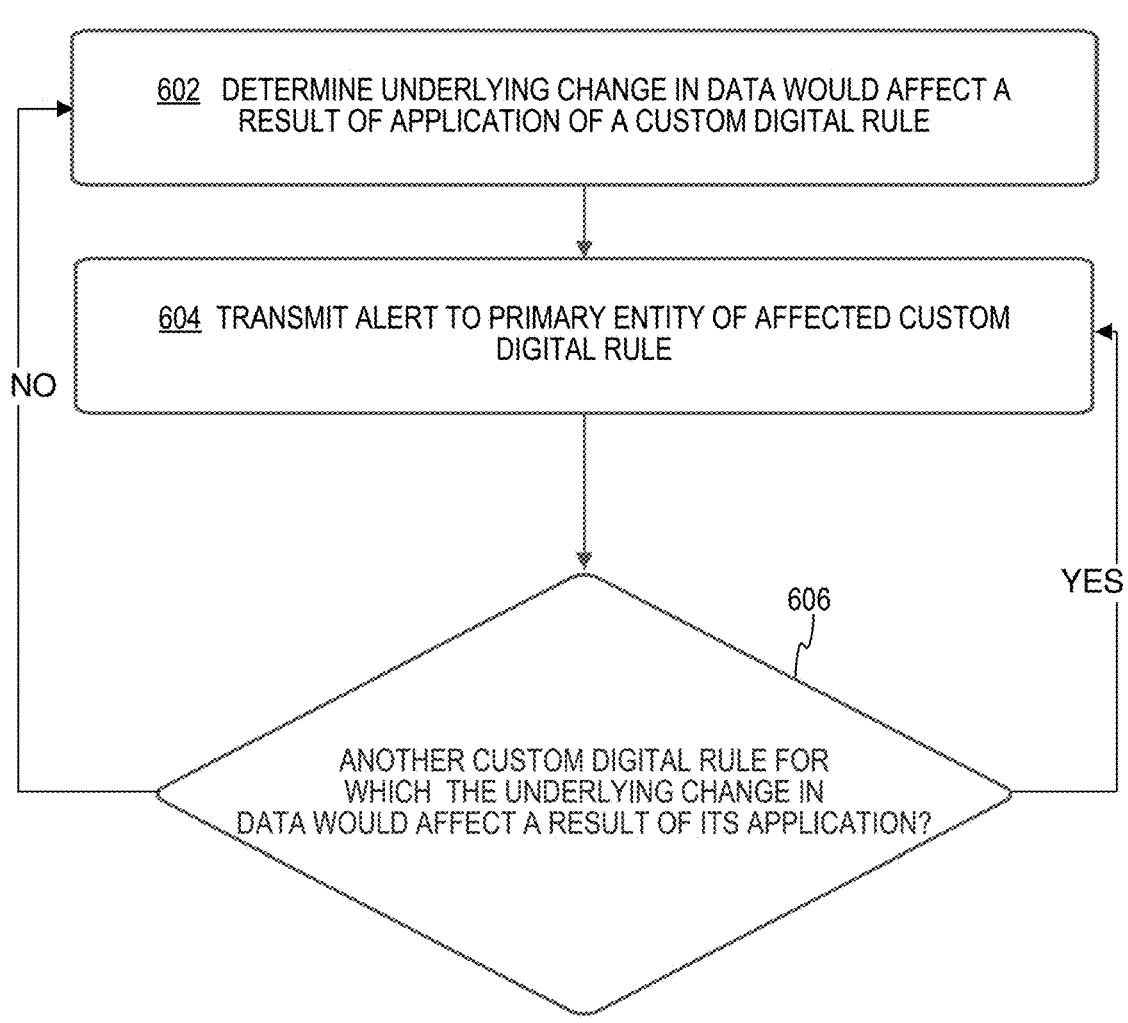
FIG. 6 is a flowchart for illustrating a sample method for transmitting an alert to the certain primary entity for multiple custom digital rules that is useful in the method of FIG. 3, according to embodiments of the present disclosure, which is an improvement in automated computerized systems.

FIG. 6 is a flowchart for illustrating a sample method 600 for transmitting an alert to the certain primary entity for multiple custom digital rules that is useful in the method of FIG. 3, according to embodiments of the present disclosure, which is an improvement in automated computerized systems.

At 602, the OSP 198 determines that the underlying change in data would affect a result of application of the custom digital rule to one or more relationship instances of the certain primary entity.

At 604, the OSP 198 transmits the alert to the certain primary entity regarding the determination that the underlying change in data would affect a result of application of the custom digital rule.

At 606, the OSP 198 determines whether there is another custom digital rule for which the underlying change in data would affect a result of its application. If the OSP 198 determines there is another custom digital rule for which the underlying change in data would affect a result of its application, then the method proceeds to 604 to transmit the alert for the other custom digital rule. If the OSP 198 determines there is not another custom digital rule for which the underlying change in data would affect a result of its application, then the method proceeds to 602 to process the next underlying change in data.

FIG. 7 is a flowchart for illustrating another sample method 700 for determining that the underlying change in data would affect a result of application of the custom digital rule that is useful in the method of FIG. 3, according to embodiments of the present disclosure, which is an improvement in automated computerized systems.

At 702, the OSP 198 receives datasets representing past relationship instances of the certain primary entity.

At 704, the OSP 198 determines, based on the datasets representing past relationship instances of the certain primary entity, that the underlying change in data would affect a result of application of the custom digital rule to one or more potential future relationship instances of the certain primary entity. For example, this determination may be based on particular data in datasets representing the past relationship instances that would have or did trigger use of the custom digital rule, or to which the custom digital rule would have been or was applicable.

FIG. 8 is a flowchart for illustrating a sample method 800 for transmitting an alert to multiple primary entities regarding affected custom digital rules of those entities, according to embodiments of the present disclosure, which is an improvement in automated computerized systems.

At 802, the OSP 198 determines that the underlying change in data would affect a result of application of one or more custom digital rules to one or more relationship instances of each of a plurality of primary entities.

At 804, for each primary entity of the plurality of primary entities, the OSP 198 transmits an alert to the primary entity in response to the determination that the underlying change in data would affect a result of application of a custom digital rule of the primary entity.

Figure 9:
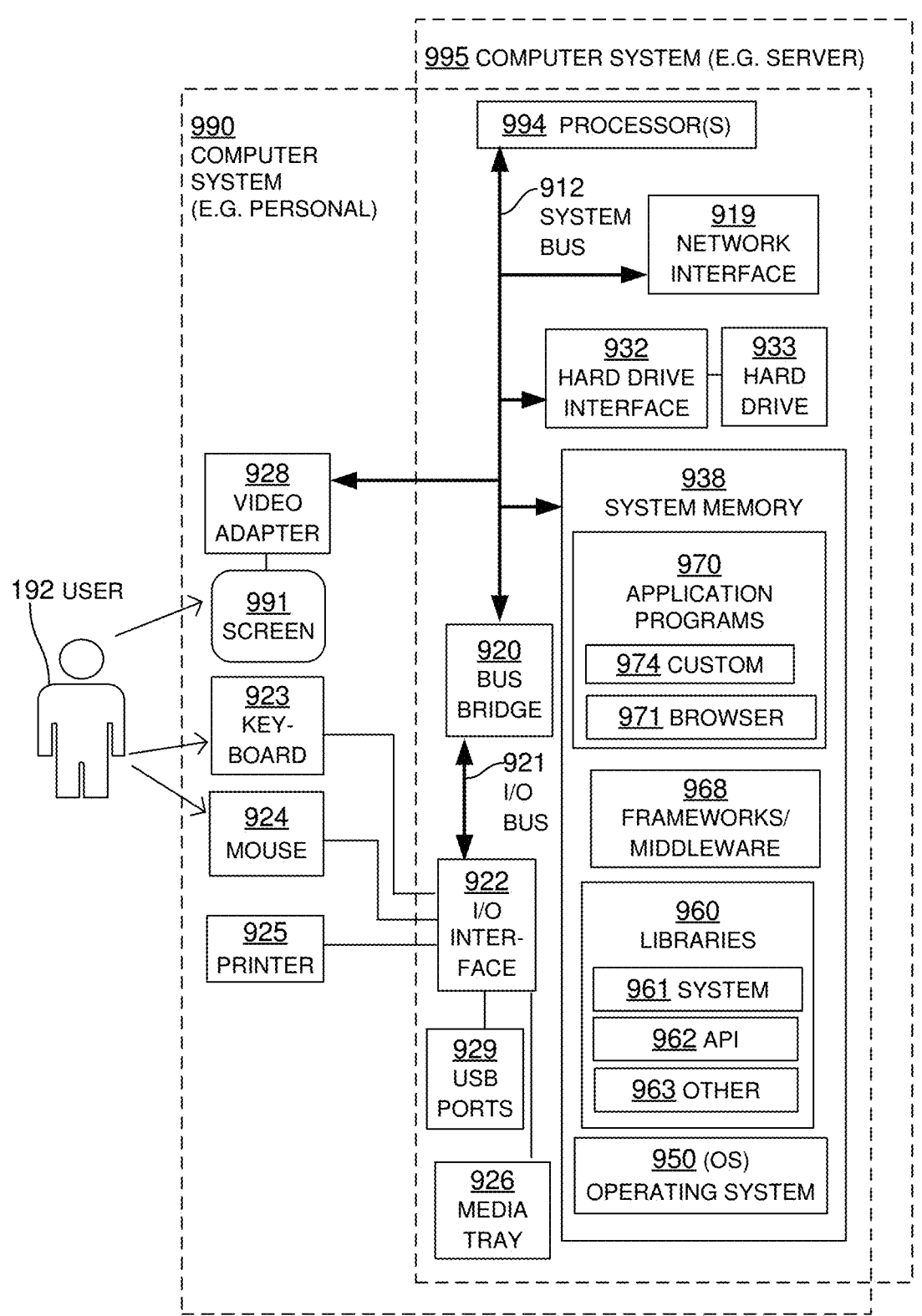
FIG. 9 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure, which is an improvement in automated computerized systems.

FIG. 9 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure, which is an improvement in automated computerized systems.

In the present example, FIG. 9 is a block diagram illustrating components of a sample computer system 990 and a sample computer system 995 according to some exemplary embodiments, which may read instructions from a machine-readable medium (e.g., a non-transitory computer-readable medium) and perform any one or more of the processes, methods, and/or functionality discussed herein. The computer system 995 may be a server, while the computer system 990 may be a personal device, such as a personal computer, a desktop computer, a personal computing device such as a laptop computer, a tablet computer, a mobile phone, and so on. Either type may be used for the computer system 195 and 190 of FIG. 1, a computer system that is part of secondary entity 196 and/or a computer system that is part of any entity or system shown in any of the Figures of the present disclosure.

The computer system 995 and the computer system 990 have similarities, which FIG. 8 exploits for purposes of economy in this document. It will be understood, however, that a component in the computer system 995 may be implemented differently than the same component in the computer system 990. For instance, a memory in a server may be larger than a memory in a personal computer, and so on. Similarly, custom application programs 974 that implement embodiments may be different, and so on.

The computer system 995 includes one or more processors 994. The processor(s) 894 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 894 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 995, or the computer system 890, are not intended to be exhaustive. Rather, they are representative, for highlighting essential components that can be used with embodiments.

The computer system 995 also includes a system bus 812 that is coupled to the processor(s) 994. The system bus 912 can be used by the processor(s) 994 to control and/or communicate with other components of the computer system 995.

The computer system 995 additionally includes a network interface 919 that is coupled to system bus 912. Network interface 919 can be used to access a communications network, such as the network 188. Network interface 919 can be implemented by a hardware network interface, such as a Network Interface Card (NIC), wireless communication components, cellular communication components, Near Field Communication (NFC) components, 5G cellular wireless interfaces, transceivers, and antennas, Bluetooth® components such as Bluetooth® Low Energy, Wi-Fi® components, etc. Of course, such a hardware network interface may have its own software, and so on.

The computer system 995 also includes various memory components. These memory components include memory components shown separately in the computer system 995, plus cache memory within the processor(s) 994. Accordingly, these memory components are examples of non-transitory machine-readable media. The memory components shown separately in the computer system 995 are variously coupled, directly or indirectly, with the processor(s) 894. The coupling in this example is via the system bus 912.

Instructions for performing any of the methods or functions described in this document may be stored, completely or partially, within the memory components of the computer system 995, etc. Therefore, one or more of these non-transitory computer-readable media can be configured to store instructions which, when executed by one or more processors 994 of a host computer system such as the computer system 895 or the computer system 890, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 995 include a non-volatile hard drive 933. The computer system 995 further includes a hard drive interface 932 that is coupled to the hard drive 933 and to the system bus 912.

The memory components of the computer system 995 include a system memory 938. The system memory 938 includes volatile memory including, but not limited to, cache memory, registers and buffers. In embodiments, data from the hard drive 433 populates registers of the volatile memory of the system memory 938.

In some embodiments, the system memory 938 has a software architecture that uses a stack of layers, with each layer providing a particular functionality. In this example the layers include, starting from the bottom, an Operating System (OS) 950, libraries 960, frameworks/middleware 968 and application programs 970, which are also known as applications 970. Other software architectures may include less, more or different layers. For example, a presentation layer may also be included. For another example, some mobile or special purpose operating systems may not provide a frameworks/middleware 968.

The OS 950 may manage hardware resources and provide common services. The libraries 960 provide a common infrastructure that is used by the applications 970 and/or other components and/or layers. The libraries 960 provide functionality that allows other software components to perform tasks more easily than if they interfaced directly with the specific underlying functionality of the OS 950. The libraries 960 may include system libraries 961, such as a C standard library. The system libraries 961 may provide functions such as memory allocation functions, string manipulation functions, mathematical functions, and the like.

In addition, the libraries 960 may include API libraries 962 and other libraries 963, such as for SDKs. The API libraries 962 may include media libraries, such as libraries to support presentation and manipulation of various media formats such as MPEG4, H.264, MP3, AAC, AMR, JPG, and PNG. The API libraries 962 may also include graphics libraries, for instance an OpenGL framework that may be used to render 2D and 3D in a graphic content on the screen 991. The API libraries 962 may further include database libraries, for instance SQLite, which may support various relational database functions. The API libraries 962 may additionally include web libraries, for instance WebKit, which may support web browsing functionality, and also libraries for applications 970.

The frameworks/middleware 968 may provide a higher-level common infrastructure that may be used by the applications 970 and/or other software components/modules. For example, the frameworks/middleware 968 may provide various Graphic User Interface (GUI) functions, high-level resource management, high-level location services, and so forth. The frameworks/middleware 968 may provide a broad spectrum of other APIs that may be used by the applications 970 and/or other software components/modules, some of which may be specific to the OS 950 or to a platform.

The application programs 970 are also known more simply as applications and apps. One such app is a browser 971, which is a software that can permit the user 192 to access other devices in the internet, for example while using a Graphic User Interface (GUI). The browser 971 includes program modules and instructions that enable the computer system 995 to exchange network messages with a network, for example using Hypertext Transfer Protocol (HTTP) messaging.

The application programs 970 may include one or more custom applications 974, made according to embodiments. These can be made so as to cause their host computer to perform operations according to embodiments disclosed herein. Of course, when implemented by software, operations according to embodiments disclosed herein may be implemented much faster than may be implemented by a human mind; for example, tens or hundreds of such operations may be performed per second according to embodiments, which is much faster than a human mind can do.

Other such applications 970 may include Enterprise Resource Planning (ERP) application, accounting applications, financial applications, accounting applications, payment systems applications, database and office applications, contacts application, a word processing application, a location application, a media application, a messaging application, and so on. Applications 970 may be developed for the Windows™ operating system, and/or by using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 970 may use built-in functions of the OS 950, of the libraries 460, and of the frameworks/middleware 968 to create user interfaces for the user 192 to interact with.

The computer system 995 moreover includes a bus bridge 920 coupled to the system bus 912. The computer system 995 furthermore includes an input/output (I/O) bus 921 coupled to the bus bridge 920. The computer system 995 also includes an I/O interface 922 coupled to the I/O bus 921.

For being accessed, the computer system 995 also includes one or more Universal Serial Bus (USB) ports 929. These can be coupled to the I/O interface 922. The computer system 995 further includes a media tray 926, which may include storage devices such as CD-ROM drives, multimedia interfaces, and so on.

The computer system 990 may include many components similar to those of the computer system 995, as seen in FIG. 9. In addition, a number of the application programs may be more suitable for the computer system 990 than for the computer system 995.

The computer system 990 further includes peripheral input/output (I/O) devices for being accessed by a user 192 more routinely. As such, the computer system 990 includes a screen 991 and a video adapter 928 to drive and/or support the screen 991. The video adapter 928 is coupled to the system bus 912.

The computer system 990 also includes a keyboard 923, mouse 924, and a printer 925. In this example, the keyboard 923, the mouse 924, and the printer 925 are directly coupled to the I/O interface 922. Sometimes this coupling is wireless or may be via the USB ports 929.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 994.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

OPERATIONAL EXAMPLES—USE CASES

Figure 10:
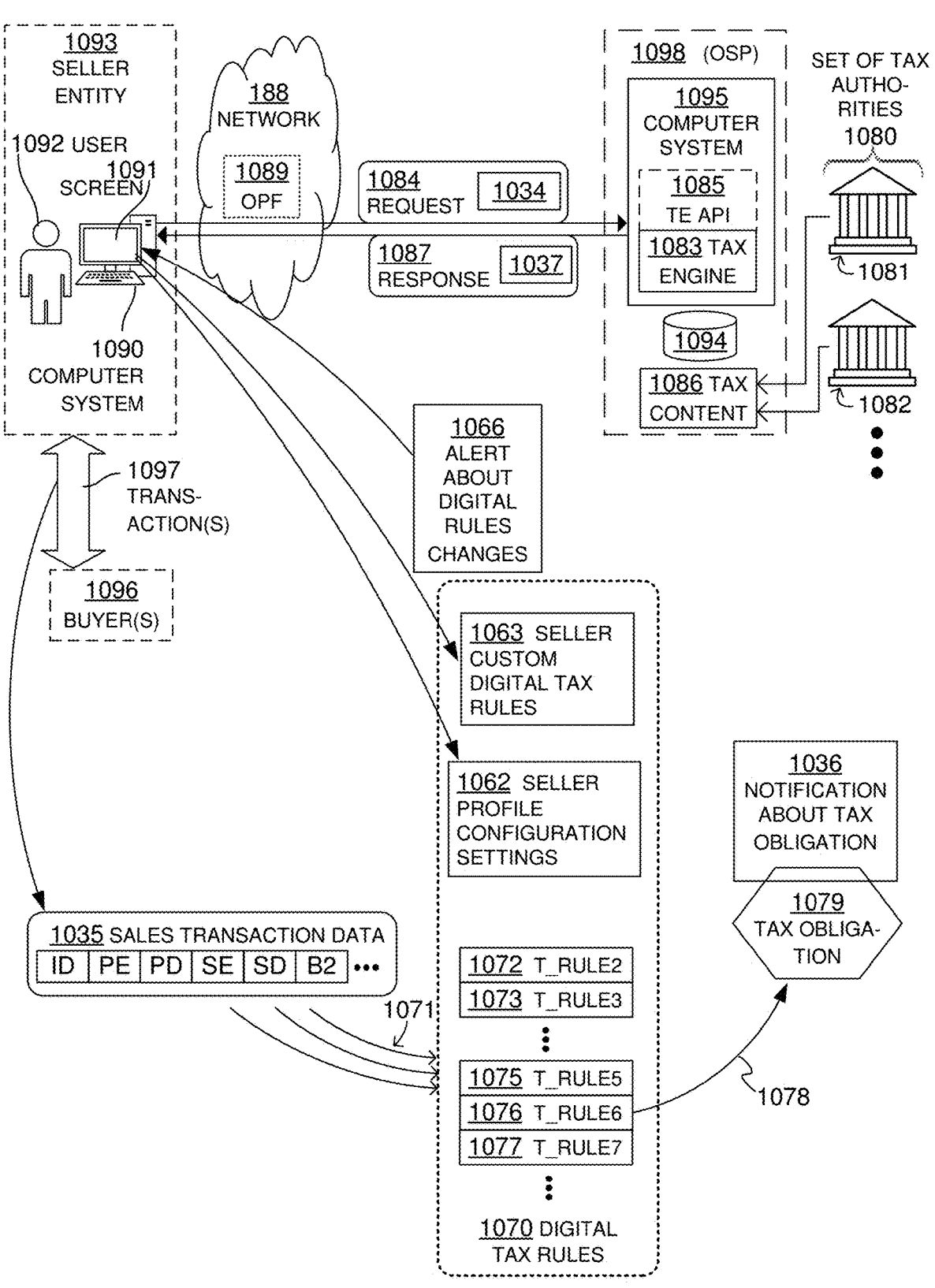
FIG. 10 is a diagram of sample aspects for describing operational examples and use cases of embodiments, according to embodiments of the present disclosure, which is an improvement in automated computerized systems.

The above-mentioned embodiments have one or more uses. Aspects presented below may be implemented as was described above for similar aspects. (Some, but not all, of these aspects have even similar reference numerals.) FIG. 10 is a diagram of sample aspects for describing operational examples and use cases of embodiments, according to embodiments of the present disclosure.

As a sample use case, tax statutes, tax rules, and tax rates change often, and new tax rules and tax types are continuously added. The OSP 1098 researches the underlying statutes and tax rules and guidance issued by the tax authorities 1080, uses them to generate or obtain digital tax rules 1070 to compute tax obligations (also referred to as tax liabilities) for primary entities, such as seller 1093, and makes the research available to all its primary entities. In addition, the OSP 1098 will keep enhancing its coverage of transaction compliance scenarios by enhancing its content and by building logic to determine increasing numbers of different types of compliance liabilities (e.g. tax types) required to be collected and paid to governing authorities, such as tax authorities 1080. Primary entities trust the OSP 1098 for compliance and may expect the OSP 1098 to take an increasing amount of compliance burden away from their shoulders. However, with more than 10,000 tax jurisdictions in USA alone, it is a mammoth task to stay on top of these changes. For example, different tax jurisdictions have different rules for when a seller is required to collect and remit sales tax. A tax authority such as a state or even a city may set its own economic nexus rules for when a business is considered to be "engaged in business" with it, and therefore that business is subject to registration and collection of sales taxes. These nexus rules are often based on thresholds indicating a total number of sales transactions and/or a total monetary value of all sales in a given time period. It is a technical challenge for a business, such as seller 1093, to constantly ascertain whether it meets these nexus different requirements in different tax jurisdictions in real time as transactions occur given the ever changing amount of sales in various different tax jurisdictions for the business in various time periods.

Furthermore, sellers may provide their own custom digital rules 1063 that override other digital tax rules 1070, such as one or more of digital tax rules T_RULE2 1072, T_RULE3 1073, T_RULE5 1075, T_RULE6 1076 and T_RULE7 1077. For example, digital tax rule T_RULE2 1076 may indicate a tax rate of 1.9% for a particular tax jurisdiction, but the seller 1093 may have created a custom digital tax rule via the OSP 1098 (which is saved as part of seller custom digital tax rules 1063) that overrides T_RULE2 1076 with a 1.7% tax rate. However, when the underlying digital tax rules change based on changes from the tax authorities 1080, or there are other underlying changes in data used to process transactions of the seller 1093 that would affect a result of application of one or more custom digital tax rules 1063, this presents a technical challenge to properly and efficiently address these changes. For example, such changes may make the custom digital rule (or the reason the custom rule was created) no longer needed, no longer relevant or cause the custom digital rule to produce a resource that is incorrect or unintended. Using the example above, the tax rate indicated by tax rule T_RULE2 1076 may have changed from 1.9% to 1.5%, but the seller 1093 may still be using a custom digital tax rule via the OSP 1098 (which is saved as part of seller custom digital tax rules 1063) that overrides T_RULE2 1072 with a 1.7% tax rate. Therefore, application of the custom digital tax rule is causing the seller to charge more tax than the current tax rate of 1.5%.

Thus, to solve the solve the above technical problems, embodiments include functionality that enables the OSP 1098 to alert clients, such as seller 1093, within a user interface or via other communications of relevant taxability changes before or within a specified timeframe after the change effective date. For example, if a client has a custom tax rule that is affected by the change, has nexus in an affected jurisdiction, is leveraging an affected tax category or tax code and/or has transacted in the affected jurisdictions in the previous 12-months, the client receives an alert in their UI detailing the change and its effective date enabling the client (or the client to cause the OSP 1098) to more efficiently update or remove the custom digital rule based on such changes. The client may also receive a hyperlink that allows the client to more efficiently access the citation support for the change. Therefore, the systems and methods described herein for smart alerting of an entity of an OSP about custom rules being impacted by underlying changes in data that the OSP uses to process the entity data improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

In an example embodiment, upon updating its own underlying digital tax rules, such as T_RULE2 1072, T_RULE3 1073, T_RULE5 1075, T_RULE6 1076 and T_RULE7 1077, the OSP 1098 notifies clients (e.g., seller 1093) whose custom rules may be affected by such an underlying change in data used to process the client data (e.g. sales transaction data 1035); provides options for such clients regarding updating, revising or expiring their affected custom digital rules; and makes a recommendation applying algorithms using client data from clients in the same or similar industries. The OSP 1098 may select which clients to notify. For such selecting, the clients may self-select, and/or the OSP 1098 may detect which client has a user profile (such as indicated in seller profile configuration settings 1062) and/or custom digital tax rules 1063 that would be impacted. The OSP 1098 may then alert such detected clients, and mark the affected custom digital tax rule with an alert 1066 about the digital rule changes.

Operational examples and sample use cases are possible where the attribute of an entity in a dataset is any one of: the entity's name; type of entity; a physical location such as an address; a contact information element; transactions of the entity; an identifier of a specific source of revenue received for a transaction of the entity; characteristics of transactions of the entity; licensure and/or or registration of the entity and/or products or services the entity produces, sells, stores and/or transfers; products or services produced, sold, stored and/or transferred by the entity; types of products or services produced, sold, stored and/or transferred by the entity; a location to which products are sent, shipped or transferred; a location from which products are received; a location of a property owned by the entity; a location of a property owned by the entity within a particular region of other domain; an affiliation; a characterization of another entity; a characterization by another entity; an association or relationship with another entity (general or specific instances); an asset of the entity; a declaration by or on behalf of the entity; and so on. Different resources may be produced in such instances, and so on.

In particular, FIG. 10 is diagram for an operational example and use case where the resource 1079 includes a tax obligation of a primary entity, such as seller 1093 of goods or services and/or a secondary entity, such as buyer 1096 of goods or services, due to a transaction 1097. It will be recognized that aspects of FIG. 10 have similarities with aspects of FIG. 1. Portions of such aspects may be implemented as described for analogous aspects of FIG. 1. In particular, a computer system 1095 is shown, which is used to help primary entities, such as a seller 1093 and an associated user 1092, with tax compliance. Further in this example, the computer system 1095 is part of an OSP 1098 that is implemented as a Software as a Service (SaaS) provider, for being accessed by the user 1092 online. Alternately, the functionality of the computer system 1095 may be provided locally to a user.

The user 1092 may be standalone. The user 1092 may use a computer system 1090 that has a screen 1091. In embodiments, the user 1092 and the computer system 1090 are considered part of the seller 1093, which is also known as entity 1093. The seller 1093 can be a business, such as a seller of items, a reseller, and so on. The user 1092 can be an employee, a contractor, or otherwise an agent of the entity 1093. In use cases, the seller 1093 and the buyer 1096 are performing the buy-sell transaction 1097. The transaction 1097 will have data that is known to the seller 1093, similarly with what was described by the relationship instance 197 of FIG. 1B.

In a number of instances, the user 1092 and the seller 1093 use software applications to manage their business activities, such as sales, resource management, production, inventory management, delivery, billing, and so on. The user 1092 and/or the seller 1093 may further use accounting applications to manage purchase orders, reservations, bookings, sales invoices, refunds, payroll, accounts payable, accounts receivable, and so on. Such software applications, and more, may be used locally by the user 1092 or from an Online Processing Facility (OPF) 1089 that has been engaged for this purpose by the user 1092, and/or the seller. In such use cases, the OPF 1089 can be a Mobile Payments system, a Point of Sale (POS) system, an Accounting application, an Enterprise Resource Planning (ERP) provider, an e-commerce provider, an electronic marketplace, a Seller Relationship Management (CRM) system, and so on.

Businesses have tax obligations to various tax authorities of respective domains (e.g., respective tax jurisdictions). A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority, such as tax authority 1081 or tax authority 1082 promulgates new tax types of which the seller 1093 is presently unaware.

Tax jurisdictions are defined mainly by geography. Businesses have tax obligations to various tax authorities within the respective tax jurisdictions. There are various tax authorities, such as that of a country, of a state, of a municipality, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A technical problem for businesses is that the above-mentioned software applications generally cannot provide tax information that is accurate and current enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an under-payment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

To help with such complex determinations and solve such technical problems, the computer system 1095 may be specialized device for tax compliance as disclosed herein. The computer system 1095 may have one or more processors and memory, for example, as was described for the computer system 195 of FIG. 1. The computer system 1095 thus implements a tax engine 1083 determine sales tax obligations on transactions associated with a particular jurisdiction for sellers based on an economic threshold being crossed for a particular tax jurisdiction. The tax engine 1083 can be as described for the service engine 183.

The computer system 1095 may further store locally entity data, i.e. data of user 1092, of entity 1093, any of which/whom may be a seller, and/or a seller or a buyer in a sales transaction in various embodiments. The entity data may include profile data of the seller and transaction data from which a determination of a tax obligation is desired. In the online implementation of FIG. 10, the OSP 1098 has a database 1094 for storing the entity data. This entity data may be inputted by the user 1092, and/or caused to be downloaded or uploaded by the user 1092 from the computer system 1090 or from the OPF 1089, or extracted from the computer system 1090 or from the OPF 1089, and so on. In other implementations, a simpler memory configuration may suffice for storing the entity data.

Digital tax content 1086 is further implemented within the OSP 1098. The digital tax content 1086 can be a utility that stores digital tax rules 1070 for use by the tax engine 1083. As part of managing the digital tax content 1086, there may be continuous updates of the digital tax rules, by inputs gleaned from a set 1080 of different tax authorities 1081, 1082, . . . . Updating may be performed by humans, or by computers, and so on. As mentioned above, the number of the different tax authorities in the set of tax authorities 1080 may be very large and the digital tax rules resulting from tax regulations promulgated by such tax authorities in the set 1080, once recognized and stored by the OSP 1098, may be used to determine whether economic nexus thresholds have been met or exceeded and compute such tax obligations based on an automatic collection of sales tax option selection 1040 received from the seller 1093, and may also be (or be an indication of) an underlying change in data used to process sales transaction data of the seller 1093 to determine a tax obligation.

For a specific determination of a tax obligation, the computer system 1095 may receive one or more datasets. A sample received dataset 1035 can be similar to what was described for the dataset 135 of FIG. 1. In this example, the computer system 1090 transmits a request 1084 that includes a payload 1034, and the dataset 1035 is received by the computer system 1095 parsing the received payload 1034. In this example, the single payload 1034 encodes the entire dataset 1035, but that is not required, as mentioned earlier. The request 1084 may also include particular option selections regarding the one or more predefined services that the OSP 198 can be configured to perform, such as options regarding custom digital tax rules 1063 used to override other corresponding stored digital tax rules 1070 used to produce the tax obligation 1079 and options to receive alerts, such as alert 1066 about digital rules changes. Such alerts may be received in response to a determination by the OSP 1098 that an underlying change in data used to process the seller data, such as transaction dataset 1035, would affect a result of the application of a particular custom digital tax rule of seller custom digital tax rules 1063 to one or more transactions of the seller represented by transaction dataset 1035.

The tax engine 1085 may communicate with various other systems, programs, entities and remote devices via a tax engine (TE) API 1085. The TE API 1085 may be designed to take advantage of existing protocols. While REST API can be used over nearly any protocol, it usually takes advantage of HTTP (Hyper Text Transfer Protocol) when used for Web APIs. This architecture enables the seller 1093 to directly consume a REST API from their particular application, without using a connector. The particular application of the remote device may be able to fetch internally from the remote device the details required for the service desired from the OSP 1098, and thus send or push the request 1084 to the TE API 1085. In turn, the TE API 1085 talks in the background to the tax engine 1083. The tax engine 1083 determines the requested tax obligation 0179, and sends an aspect of it back to the TE API 1085.

In this example, the dataset 1035 has been received because it is desired to determine any tax obligations arising from the buy-sell transaction 1097. As such, the sample received dataset 1035 has values that characterize attributes of the buy-sell transaction 1097. Accordingly, in this example the sample received dataset 1035 has a value ID for an identity of the dataset 1035 and/or the transaction 1097. The dataset 1035 also has a value PE for the name of the seller 1093 or the user 1092, which can be the seller 1093 making sales transactions, some online. The dataset 1035 further has a value PD for relevant data of the seller 1093 the user 1092, or the transaction, such as calendar year of the transaction, an address, place(s) of business, prior nexus determinations with various tax jurisdictions, and so on. The dataset 1035 also has a value SE for the name of the buyer 1096. The dataset 1035 further has a value SD for relevant data of the buyer 1096, entity-driven exemption status, and so on. The dataset 1035 has a value B2 for the sale price of the item sold.

The dataset 1035 may fewer values or have additional values, as indicated by the dot-dot-dot in the dataset 1035. These values may characterize further attributes, such as characteristics of the item being sold, data identifying of or otherwise relating to a license or registration required for the transaction, a date and possibly also time of the transaction 1097, and so on.

The digital tax rules 1070 have been created so as to accommodate tax rules that the set 1080 of different tax authorities 1081, 1082 . . . promulgate within the boundaries of their tax jurisdictions. In FIG. 5, five sample digital tax rules are shown, namely T_RULE2 1072, T_RULE3 1073, T_RULE5 1075, T_RULE6 1076 and T_RULE7 1077. Additional digital tax rules 1070 are suggested by the vertical dot-dot-dots. Similarly with FIG. 1, some of these digital tax rules may be digital main rules that determine the tax obligation 1079, while others can be digital precedence rules that indicate economic thresholds, determine when economic thresholds are crossed or which of the digital main rules is to be applied in the event of conflict. In some use cases, digital main tax rules may be about a sales tax or use tax being owed due to the transaction 1097 at a certain percentage of the purchase price. Digital precedence rules may be digital tax rules that determine whether particular digital tax rules are to be applied for origin-based or destination-based jurisdictions, how to override for diverse tax-ability of individual items, for temporary tax holidays, for exemptions from having to pay sales tax based on who the buyer is, and also based on nexus, and so on. In the present example, digital precedence rules may be digital tax rules that determine whether particular digital tax rules are to be applied based on whether economic threshold has been met or exceeded for one or more tax jurisdictions associated with a transaction, such as transaction 1097, and/or based on whether or not the seller has selected to have the OSP 1098 automatically produce one or more tax obligations for the dataset according to whether such economic thresholds have been met or exceeded.

Similarly with FIG. 2, these digital tax rules 1070 can be implemented or organized in different ways. In some use cases they can be organized with conditions and conse-quents, such as was described earlier in this document. Such conditions may relate to geographical boundaries, sources of revenue, effective dates, and so on, for determining where and when a digital tax rule or tax rate is to be applied. These conditions may be expressed as logical conditions with ranges, dates, other data, and so on. Values of the dataset 1035 can be iteratively tested against these logical condi-tions according to arrows 1071. In such cases, the conse-quents may indicate one or more economic thresholds and tax obligations, such as to indicate different types of taxes that are due, rules, rates, exemption requirements, reporting requirements, remittance requirements, etc.

In this example, a certain digital tax rule T_RULE5 1076 is shown as identified and used, which is indicated also by the beginning of an arrow 1078. Identifying may be per-formed responsive to the values of the dataset 1035, which are shown as considered for digital tax rules 1070 by arrows 1071. For example, it can be recognized that a condition of the digital tax rule T_RULE5 1075 is met by one or more of the values of the dataset 1035.

As such, the computer system 1095 may produce the tax obligation 1079 and tax return document, which is akin to producing the resource 179 of FIG. 1. The computer system 1095 may also file or otherwise send (or cause to be filed or sent) the tax return document to one or more of the appli-cable tax authorities in the set of tax authorities 1080 via network 188. The tax obligation 1079 can be produced by the computer system 1095 applying the certain digital tax rule T_RULE5 1075, as indicated by the arrow 1078. In this example, the consequent of the identified certain digital tax rule T_RULE5 1075 may specify that an economic thresh-old has been met or exceeded and thus a sales tax is due for an item, the amount is to be determined by a multiplication of the sale price of the value B2 by a specific rate, the tax return form that needs to be prepared and filed, a date by which it needs to be filed, and so on.

The computer system 1095 may then cause a notification 1036 to be transmitted. The notification 1036 can be about an aspect of the tax obligation 1079, similarly with the notification 136 of FIG. 1. In the example of FIG. 10, the notification 1036 is caused to be transmitted by the computer system 1095 as an answer to the received dataset 1035. The notification 1036 can be about an aspect of the tax obligation 1079. In particular, the notification 1036 may inform about the aspect of the tax obligation 1079, namely that it has been determined, where it can be found, what it is, or at least a portion or a statistic of its content, and so on.

The notification 1036 can be transmitted to one of an output device and another device that can be the remote device, from which the dataset 1035 was received. The output device may be the screen of a local user or a remote user. The notification 1036 may thus cause a desired image to appear on the screen, such as within a Graphical User Interface (GUI) and so on. The other device may be a remote device, as in this example. In particular, the computer system 1095 causes the notification 1036 to be communicated by being encoded as a payload 1037, which is carried by a response 1087. The response 1087 may be transmitted via the network 188 responsive to the received request 1084. The response 1087 may be transmitted to the computer system 1090, or to OPF 1089, and so on. As such, the other device can be the computer system 1090, a device of the OPF 1089, or the screen 1091 of the user 1092, and so on. In this example the single payload 1037 encodes the entire notification 1036, but that is not required, similarly with what is written above about encoding datasets in payloads. Along with the aspect of the tax obligation 1079, it is advantageous to embed in the payload 1037 the ID value, one or more values of the dataset 1035 and/or one or more of the digital tax rules 1070 used to compute the tax obligation 1079. This will help the recipient correlate the response 1087 to the request 1084, and therefore match the received aspect of the tax obligation 1079 as the answer to the received dataset 1035.

The seller custom digital tax rules 1063 may be identified and applied to seller data such as the seller sales transaction data represented by dataset 1035 in the manner described above for the other digital tax rules of digital tax rules 1070, such as T_RULE2 1072, T_RULE3 1073, T_RULE5 1075, T_RULE6 1076 and T_RULE7 1077. The alert about digital rules changes 1066 may also be communicated in the manner described above for the notification 1036.

In an example embodiment, the OSP 1098 includes func-tionality that alerts clients, such as seller 1093, within a user interface (UI), API and/or email of pending tax compliance changes that may impact their unique tax profile configu-rations, such as those in the seller profile configuration settings, application of seller custom digital tax rules 1063, and subsequent calculations (e.g., changes to a rate or definition for a tax jurisdiction, tax category or tax code). Such an alert is represented by the alert about digital rules changes 1066.

For example, in various embodiments, the OSP 1098 may detect, based on seller transaction data represented by data-set 1035 and seller profile configuration settings 1062, if an account of the seller 1093: has transactions in an affected tax jurisdiction; has enabled collection in affected jurisdictions; has custom rules associated with specific codes or jurisdic-tions; is leveraging affected tax categories or tax codes; or if an account has proactively indicated an interest, for example, in their seller profile configuration settings 1062, in receiving alerts related to the specific tax jurisdictions, tax categories, or tax codes regardless of any previous transac-tions in the affected jurisdictions, tax categories, or tax codes.

Then the user 1092 receives an alert 1066 from the OSP 1098 in a UI or via API, email, etc., detailing the change, its effective date, along with a justification for the alert. For example, the alert my include, but is not limited to: a summary of data that triggered the alert, rate change legislation, directions or suggestions on next steps and actions to take to address the changes. Various examples of changes that may trigger the alert 1066 may include, but are not limited to: tax jurisdiction changes (e.g., new local tax jurisdictions, expiring tax jurisdictions, expanding tax jurisdictions, changes in tax jurisdiction boundaries and/or geography); changes to tax rates (e.g., a new tax rate, an increasing tax rate, a decreasing tax rate, and/or tax rate changes in streamlined sales tax (SST), streamlined use tax (SUT), value-added tax (VAT), goods and services tax (GST), custom, duty and import tax (CDIT), communications tax, lodging tax, excise tax, alcohol and beverage tax, etc.); changes to the taxability logic or rules of OSP tax codes utilized by tax engine 1083 (e.g., new, expiring, updating or expanding tax codes); and changes to entity use codes (new, expiring, or expanding use codes, or updates to use codes).

The alert 1066 may suggest options for changes to the seller profile configuration settings 1062 to address the taxability changes based on various scenarios. The alert 1066 may further recommend an option by applying algorithms using client data, such as data of other sellers, in the same or similar industry, or allow the client, such as seller 1093, to initiate a statement of work (SOW) request to professional services for tax profile evaluation. The alert 1066 may also notify the seller 1093, partner or other affected entity of relevant taxability changes when there are digital tax rules 1070 applicable to the seller 1093, partner or other affected entity using or relying on changed tax jurisdictions, tax categories, and/or tax codes for a specific partner integration.

Figure 11:
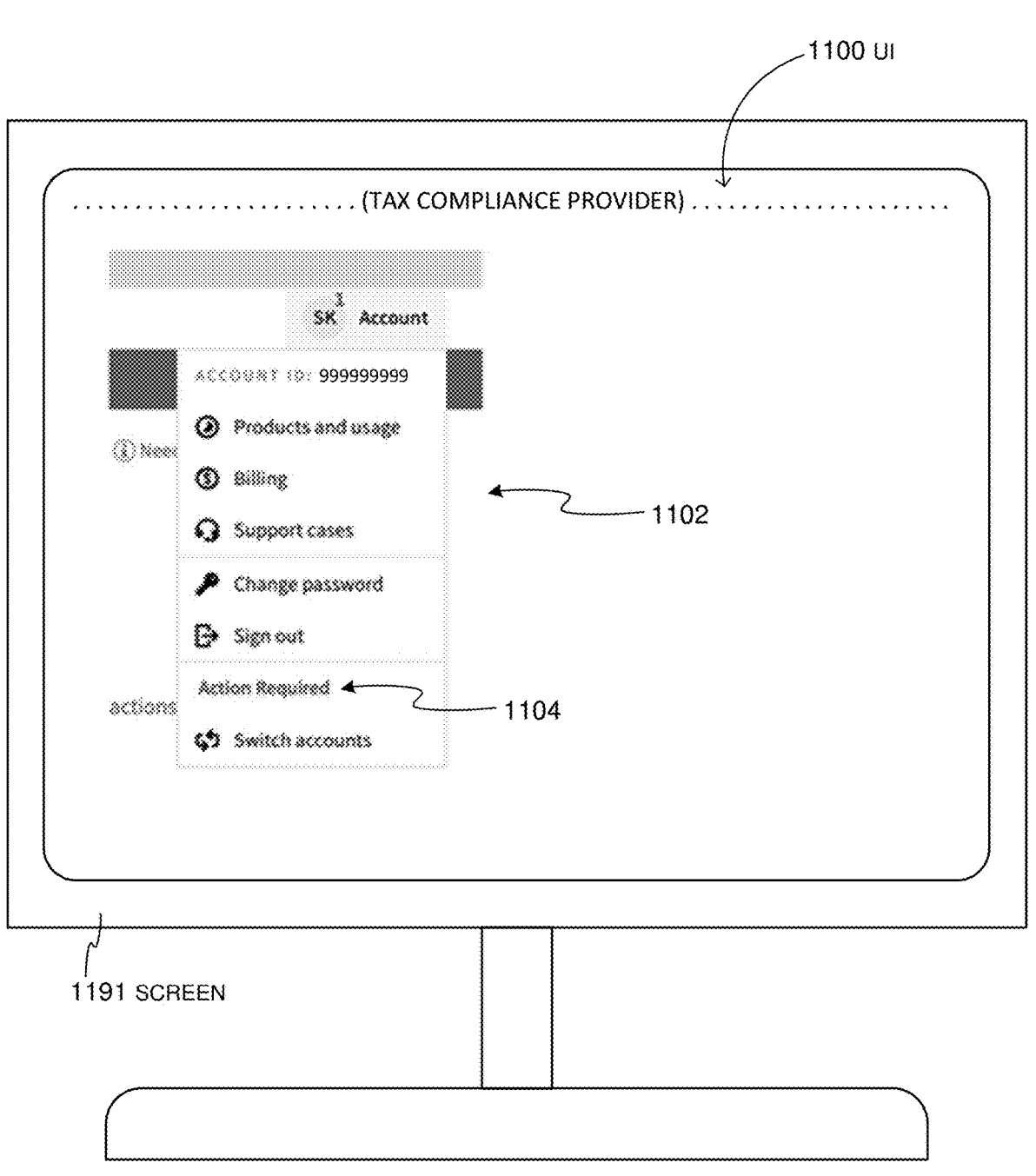
FIG. 11 is a sample view of a User Interface (UI) in which a notification is presented in an account drop-down menu indicating an action is required regarding custom digital rules of the account, according to embodiments of the present disclosure, which is an improvement in automated computerized systems.

FIG. 11 is a sample view of a User Interface (UI) 1100 in which a notification is presented in an account drop-down menu indicating an action is required regarding custom digital rules of the account, according to embodiments of the present disclosure, which is an improvement in automated computerized systems.

Shown is UI 1100 presented on a screen 1191 of a device. For example, the screen 1191 may be screen 1091 of the computer system 1090 or other device of the seller 1093 or user 1092 of FIG. 10. UI 1100 may comprise a portion of a UI of the OSP 1098 presented to the seller 1093 or user 1092. Shown in UI 1100 is a drop-down menu 1102 providing various selectable options for an account of the seller 1093 at the OSP 1098. Shown is an "Action Required" notification 1104 in the drop down menu 1102 indicating an action is required by the seller 1093 due to an underlying change in data (e.g., a digital tax rule change affecting a custom digital tax rule of the seller) used to compute the tax obligation 1079 of the seller 1093. The user 1092 may select the "Action Required" notification 1104 to receive further information regarding the action required to address the change.

Figure 12:
FIG. 12 is a sample view of a User Interface (UI) in which a notification is presented in an account settings menu indicating an action is required regarding custom digital rules of the account, according to embodiments of the present disclosure, which is an improvement in automated computerized systems.

FIG. 12 is a sample view of a User Interface (UI) 1200 in which a notification is presented in an account settings menu indicating an action is required regarding custom digital rules of the account, according to embodiments of the present disclosure, which is an improvement in automated computerized systems.

Shown is UI 1200 presented on a screen 1291 of a device. For example, the screen 1291 may be screen 1091 of the computer system 1090 or other device of the seller 1093 or user 1092 of FIG. 10. UI 1200 may comprise a portion of a UI of the OSP 1098 presented to the seller 1093 or user 1092. Shown in UI 1200 is a settings menu 1202 providing various selectable settings options and information for an account of the seller 1093 at the OSP 1098. Shown is an "Action Required" notification 1204 in the settings menu 1202 indicating an action is required by the seller 1093 due to an underlying change in data (e.g., a digital tax rule change affecting a custom digital tax rule of the seller) used to compute the tax obligation 1079 of the seller 1093. The user 1092 may select the "Action Required" notification 1204 to receive further information regarding the action required to address the change. In various embodiments the "Action Required" notification 1204 may be presented in one or more various different UI components within the seller's account at the OSP 1098 to notify the seller of the action required.

Figure 13:
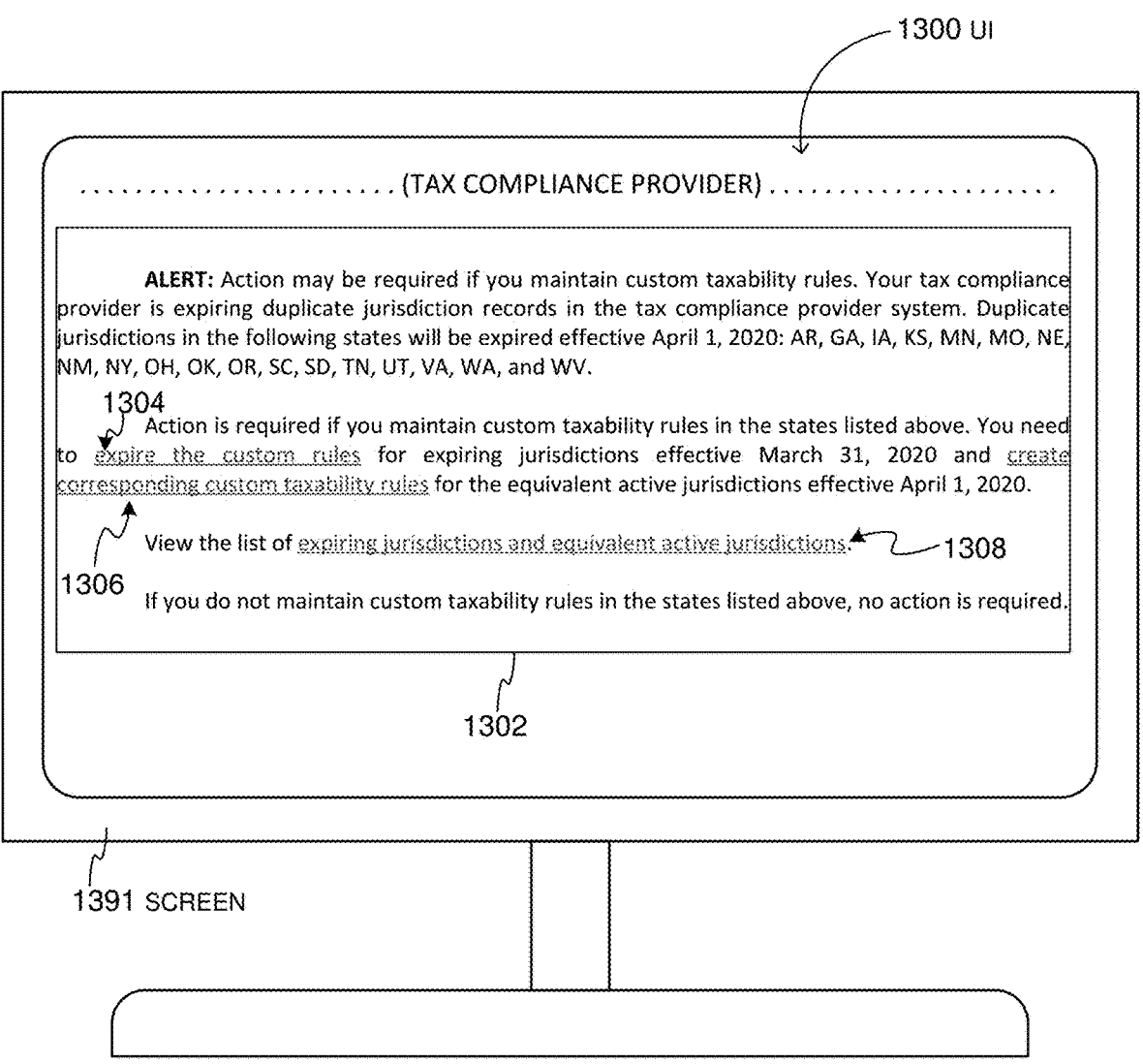
FIG. 13 is a sample view of a User Interface (UI) in which an alert is presented that may in some embodiments appear in response to a user selecting the "Action Required" user interface element of FIG. 11 or FIG. 12, according to embodiments of the present disclosure, which is an improvement in automated computerized systems.

FIG. 13 is a sample view of a User Interface (UI) 1300 in which an alert 1302 is presented that may in some embodiments appear in response to a user selecting the "Action Required" notification of FIG. 11 or FIG. 12, according to embodiments of the present disclosure, which is an improvement in automated computerized systems.

Shown is UI 1300 presented on a screen 1391 of a device. For example, the screen 1391 may be screen 1091 of the computer system 1090 or other device of the seller 1093 or user 1092 of FIG. 10. UI 1300 may comprise a portion of a UI of the OSP 1098 presented to the seller 1093 or user 1092. The alert 1302 indicates that action is required of the seller 1093 if the seller 1093 maintains custom taxability rules in the states listed in the alert because the tax compliance provider (e.g., OSP 1098) is expiring duplicate jurisdiction records in those states. Links are presented which the user 1092 may select to expire the affected custom rules, create corresponding custom taxability rules, and to view the list of expiring jurisdictions and equivalent active jurisdictions.

Figure 14:
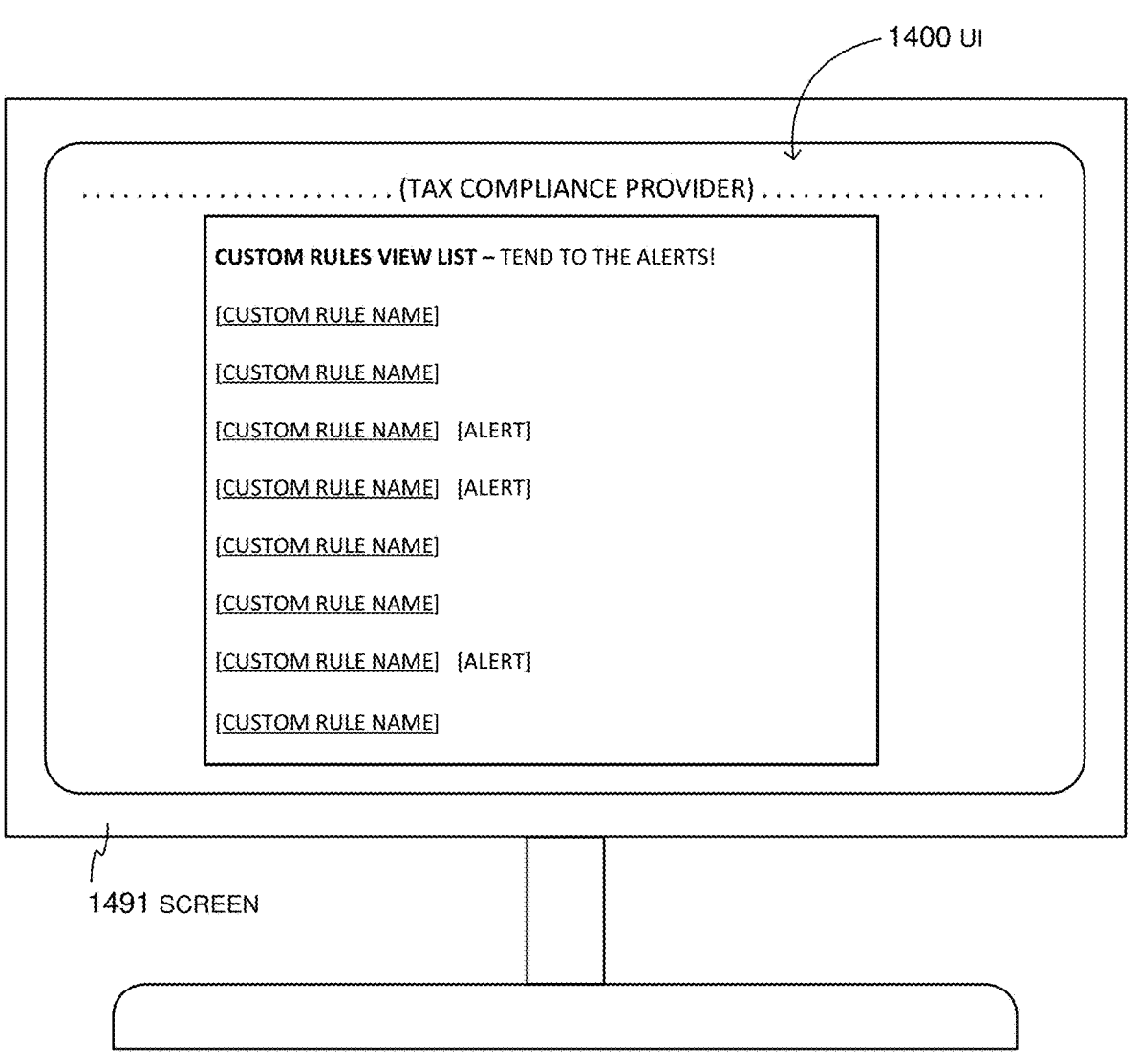
FIG. 14 is a sample view of a User Interface (UI) in which a listing of all custom rules for a certain primary entity is presented, showing alerts for those needing attention, that may in some embodiments appear in response to a user selecting the "Action Required" user interface element of FIG. 11 or FIG. 12, according to embodiments of the present disclosure, which is an improvement in automated computerized systems.

FIG. 14 is a sample view of a User Interface (UI) 1400 in which a listing of all custom rules for a certain primary entity (e.g., seller 1093) is presented, showing alerts for those needing attention, that may in some embodiments appear in response to a user selecting the "Action Required" notification of FIG. 11 or FIG. 12, according to embodiments of the present disclosure, which is an improvement in automated computerized systems.

Shown is UI 1400 presented on a screen 1491 of a device. For example, the screen 1491 may be screen 1091 of the computer system 1090 or other device of the seller 1093 or user 1092 of FIG. 10. UI 1400 may comprise a portion of a UI of the OSP 1098 presented to the seller 1093 or user 1092. Shown in the custom rules view list in UI 1400 is the selectable name of each custom rule of the seller 1093 and a selectable alert is shown next to each custom rule name for which the custom rule is affected by an underlying change in data (e.g., taxability changes) used to compute the tax obligation 1079. The user 1093 may select the corresponding alert to address the change or obtain more information on how to address the change.

Figure 15:
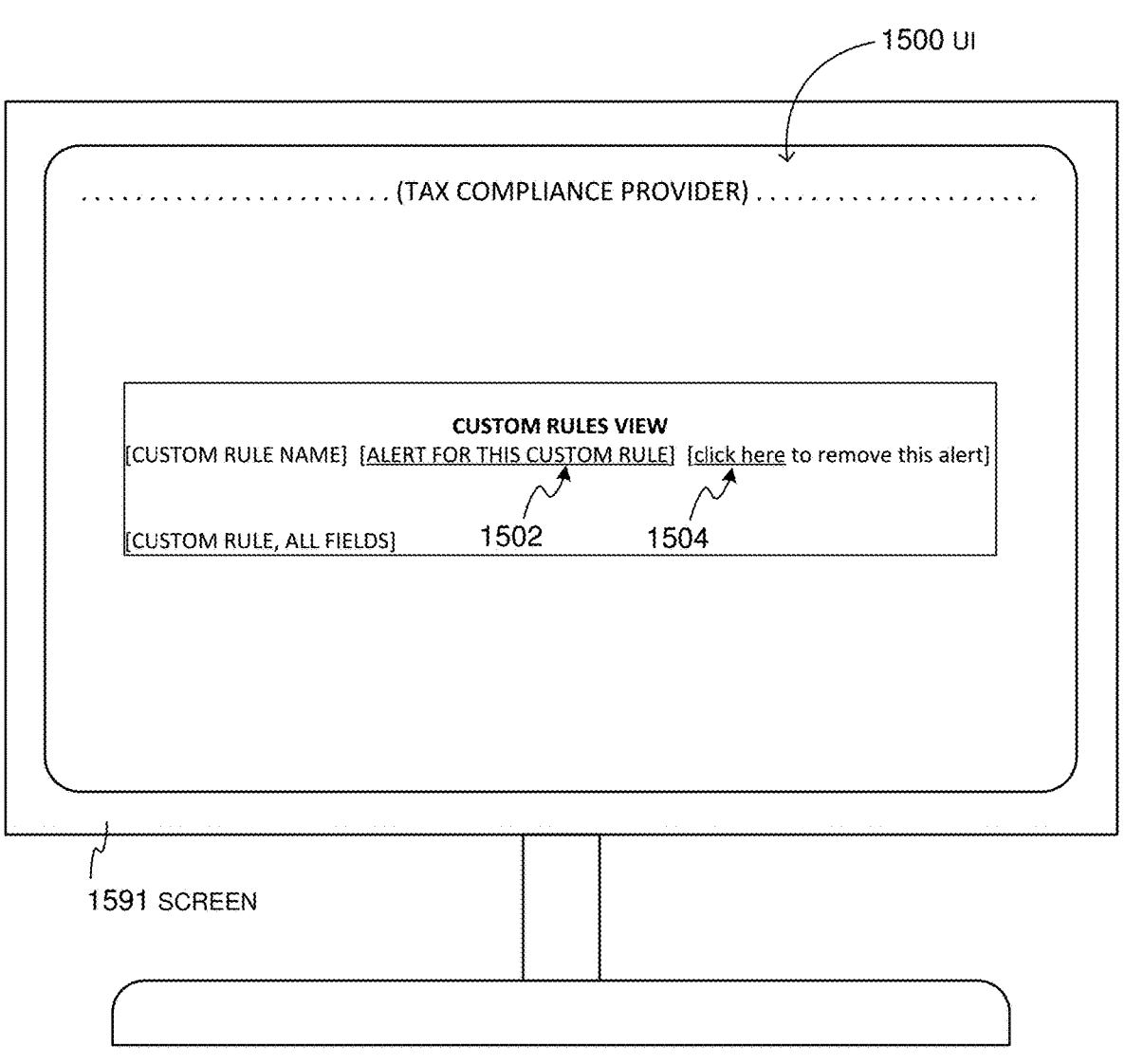
FIG. 15 is a sample view of a User Interface (UI) in which an individual selected custom rule is presented, showing an alert for the custom rule, that may in some embodiments appear in response to a user selecting the name of the custom rule from the listing of all custom rules of FIG. 14, according to embodiments of the present disclosure, which is an improvement in automated computerized systems.

FIG. 15 is a sample view of a User Interface (UI) 1500 in which an individual selected custom rule is presented, showing an alert for the custom rule, that may in some embodiments appear in response to a user selecting the name of the custom rule from the listing of all custom rules in the UI 1400 of FIG. 14, according to embodiments of the present disclosure, which is an improvement in automated computerized systems.

Shown is UI 1500 presented on a screen 1591 of a device. For example, the screen 1591 may be screen 1091 of the computer system 1090 or other device of the seller 1093 or user 1092 of FIG. 10. UI 1500 may comprise a portion of a UI of the OSP 1098 presented to the seller 1093 or user

1092. A selectable alert 1502 is presented for the particular custom rule identified by the custom rule name shown in UI 1500. Also presented is a "click here to remove this alert" selectable user interface element 1504 that the user 1093 may select to remove the alert 1502. For example, the user 1093 may select to remove the alert 1502 once it is viewed or addressed.

FIG. 16 is a sample view of a User Interface (UI) 1600 in which details of an individual selected custom rule are presented, that may in some embodiments appear in response to a user selecting the name of the custom rule from the listing of all custom rules of FIG. 14 or the "Custom Rule, All Fields" selectable user interface element in the UI 1500 of FIG. 15, according to embodiments of the present disclosure, which is an improvement in automated computerized systems.

Shown is UI 1600 presented on a screen 1691 of a device. For example, the screen 1691 may be screen 1091 of the computer system 1090 or other device of the seller 1093 or user 1092 of FIG. 10. UI 1600 may comprise a portion of a UI of the OSP 1098 presented to the seller 1093 or user 1092. In addition to that which is presented in UI 1500, also presented in UI 1600 are various information fields presenting details regarding the selected custom rule (e.g., custom rule name, rule type, country, region, jurisdiction, tax type, tax code, entity use code, and tax treatment). Also presented is information indicating to which jurisdictions to the custom rule applies and how tax determinations are to be sourced for the custom rule. Underlying changes to such data presented in UI 1600, changes to how such data is used, interpreted or processed, or changes to rules that rely on such data may affect application of the custom rule. Thus, such changes may be detected by the OSP 1098 and an alert may be presented to the user 1093 in response to the detected changes.

The embodiments described above may also use synchronous or asynchronous primary entity-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, primary entity-server, or peer-to-peer, running on one or more computer systems each having one or more CPUs. Some embodiments may execute concurrently and asynchronously, and further communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored by the systems described herein and to other system components described herein may be available by mechanisms such as through C, C++, C#, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer system including at least:

one or more processors; and a non-transitory computer-readable storage medium having stored thereon instructions which, when executed by the one or more processors, result in operations for performing a task, the operations including at least:

storing a plurality of resource digital rules used for producing resources for respective relationship instances of primary entities with other entities;

storing a custom digital rule used for producing resources for relationship instances of a certain primary entity with other entities, in which the resources include a computational result resulting from processing of datasets that include data representing the relationship instances of the certain primary entity with other entities, the custom rule created based on input from the certain primary entity that is intended to override a corresponding one of the stored resource digital rules;

receiving a dataset on behalf of the certain primary entity, in which the dataset includes data representing a relationship instance between the certain primary entity and a secondary entity;

in response to the received dataset, determining whether or not the custom digital rule applies to the dataset, in which:

the custom digital rule applying to the dataset would cause the computer system to produce a first resource as a result of performing one or more tasks;

the production of the first resource involves one or more of first computing processing, first storage, and first data transmission;

the custom digital rule not applying to the dataset would cause the computer system to produce a second resource as a result of performing the one or more tasks; and the production of the second resource involves one or more of second computing processing, second storage, and second data transmission;

receiving an indication of an underlying change in data used to process primary entity data;

determining concurrently for each custom digital rule in a plurality of custom digital rules including the custom digital rule that the underlying change in data would affect a result of application of the custom digital rule to one or more relationship instances of the certain primary entity;

transmitting an alert to the certain primary entity in response to the determination that the underlying change in data would affect a result of application of the custom digital rule, in which the alert includes instructions for removing the custom digital rule;

receiving, from the certain primary entity, instructions to remove the custom digital rule in response to the certain primary entity receiving the alert;

electronically removing the custom digital rule in response to the certain primary entity receiving the alert; and electronically producing the second resource as a result of performing the one or more tasks without applying the custom digital rule, in which the removal of the custom digital rule causes the custom digital rule not to apply to the dataset, enabling timely updates to digital rules to avoid unintended resources being produced and thereby reducing computer processing.

2. The system of claim 1 in which the underlying change in data is a change to one or more of the plurality of resource digital rules.

3. The system of claim 1 in which the underlying change in data is a new resource digital rule for producing resources for respective relationship instances of primary entities.

4. The system of claim 1 in which the underlying change in data is a change in how at least one resource digital rule uses attributes of the relationship instance represented by the dataset to produce a resource for the relationship instance.

5. The system of claim 1 in which the underlying change in data is a change in one or more of: a definition of a domain associated with the relationship instance; a rate used to produce a resource associated with the relationship instance; a definition of a category or type of item that is a subject of the relationship instance; a code used to categorize, identify or define an item that is a subject of the relationship instance; a code used to categorize or define the certain primary entity or the secondary entity; a code used to categorize or define the relationship instance.

6. The system of claim 1 in which the transmitting the alert is performed before or within a specified timeframe of a change effective date of the underlying change in data.

7. The system of claim 1 in which transmitting the alert is performed only if the custom digital rule has been applied for the certain primary entity within a specified timeframe before or after a change effective date of the underlying change in data.

8. The system of claim 1 in which the operations further include:

transmitting an alert to the certain primary entity for each custom digital rule created by the primary entity for which the underlying change in data would affect a result of application of the custom digital rule.

9. The system of claim 1 in which transmitting the alert includes transmitting instructions for how to update, expire or remove the custom digital rule based on the determination that the underlying change in data would affect a result of application of the custom digital rule to one or more relationship instances of the certain primary entity.

10. The system of claim 1 in which transmitting the alert includes transmitting information indicating why the underlying change in data would affect a result of application of the custom digital rule.

11. The system of claim 1 in which transmitting the alert includes transmitting a hyperlink that allows the certain primary entity to access a citation supporting the underlying change in data.

12. The system of claim 1 in which the determining that the underlying change in data would affect a result of application of the custom digital rule includes:

receiving datasets representing past relationship instances of the certain primary entity; and determining, based on the datasets representing past relationship instances of the certain primary entity, that the underlying change in data would affect a result of application of the custom digital rule to one or more potential future relationship instances of the certain primary entity.

13. A method, including at least:

storing a plurality of resource digital rules used for producing resources for respective relationship instances of primary entities with other entities;

storing a custom digital rule used for producing resources for relationship instances of a certain primary entity with other entities, in which the resources include a computational result resulting from processing of datasets that include data representing the relationship instances of the certain primary entity with other entities, the custom rule created based on input from the certain primary entity that is intended to override a corresponding one of the stored resource digital rules;

receiving a dataset on behalf of the certain primary entity, in which the dataset includes data representing a relationship instance between the certain primary entity and a secondary entity;

in response to the received dataset, determining whether or not the custom digital rule applies to the dataset, in which:

the custom digital rule applying to the dataset would cause the computer system to produce a first resource as a result of performing one or more tasks;

the production of the first resource involves one or more of first computing processing, first storage, and first data transmission;

the custom digital rule not applying to the dataset would cause the computer system to produce a second resource as a result of performing the one or more tasks; and the production of the second resource involves one or more of second computing processing, second storage, and second data transmission, and the one or more of second computing processing, second storage, and second data transmission represents a reduction in computing processing, storage, or data transmission compared to the one or more of first computing processing, first storage, and first data transmission;

receiving an indication of an underlying change in data used to process primary entity data;

determining that the underlying change in data would affect a result of application of the custom digital rule to one or more relationship instances of the certain primary entity;

transmitting an alert to the certain primary entity in response to the determination that the underlying change in data would affect a result of application of the custom digital rule, in which the alert includes instructions for removing the custom digital rule;

receiving, from the certain primary entity, instructions to remove the custom digital rule in response to the certain primary entity receiving the alert;

electronically removing the custom digital rule in response to the certain primary entity receiving the alert; and electronically producing the second resource as a result of performing the one or more tasks without applying the custom digital rule, in which the removal of the custom digital rule causes the custom digital rule not to apply to the dataset, enabling timely updates to digital rules to avoid unintended resources being produced and thereby reducing computer processing.

14. The method of claim 13 in which the underlying change in data is a change to one or more of the plurality of resource digital rules.

15. The method of claim 13 in which the underlying change in data is a new resource digital rule for producing resources for respective relationship instances of primary entities.

16. The method of claim 13 in which the underlying change in data is a change in how at least one resource digital rule uses attributes of the relationship instance represented by the dataset to produce a resource for the relationship instance.

17. The method of claim 13 in which the underlying change in data is a change in one or more of: a definition of a domain associated with the relationship instance;

a rate used to produce a resource associated with the relationship instance; a definition of a category or type of item that is a subject of the relationship instance; a code used to categorize, identify or define an item that is a subject of the relationship instance; a code used to categorize or define the certain primary entity or the secondary entity; a code used to categorize or define the relationship instance.

18. The method of claim 13 in which the transmitting the alert is performed before or within a specified timeframe of a change effective date of the underlying change in data.

19. The method of claim 13 in which transmitting the alert is performed only if the custom digital rule has been applied for the certain primary entity within a specified timeframe before or after a change effective date of the underlying change in data.

20. The method of claim 13 in which transmitting the alert is performed only if the custom digital rule has been applied for the certain primary entity within a specified timeframe before or after a change effective date of the underlying change in data.

* * * * *